United States Patent
DeArment et al.

(10) Patent No.: US 11,706,296 B2
(45) Date of Patent: Jul. 18, 2023

(54) FAULT-TOLERANT AND HIGHLY AVAILABLE CONFIGURATION OF DISTRIBUTED SERVICES

(71) Applicant: PALANTIR TECHNOLOGIES, INC., Palo Alto, CA (US)

(72) Inventors: Greg DeArment, Seattle, WA (US); Mark Elliot, New York, NY (US); Jonathon Yu, Palo Alto, CA (US); Jon Paek, Sunnyvale, CA (US); Phillip Chen, New York, NY (US); Brian Toth, Palo Alto, CA (US); David Tolnay, Menlo Park, CA (US); Daniel Rothfus, Fort Worth, TX (US); Bradley Moylan, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/222,175

(22) Filed: Apr. 5, 2021

(65) Prior Publication Data

US 2021/0224118 A1    Jul. 22, 2021

Related U.S. Application Data

(63) Continuation of application No. 16/528,625, filed on Aug. 1, 2019, now Pat. No. 10,990,446, which is a
(Continued)

(51) Int. Cl.
*H04L 67/1095* (2022.01)
*G06F 9/44* (2018.01)
(Continued)

(52) U.S. Cl.
CPC .......... *H04L 67/1095* (2013.01); *G06F 9/44* (2013.01); *G06F 9/44505* (2013.01);
(Continued)

(58) Field of Classification Search
CPC ...... G06F 9/5005; G06F 9/44; G06F 9/44505; G06F 9/465; G06F 9/48; G06F 9/4806;
(Continued)

(56) References Cited

U.S. PATENT DOCUMENTS

| 5,748,882 A | 5/1998 | Huang |
| 6,058,373 A | 5/2000 | Blinn |

(Continued)

OTHER PUBLICATIONS

Islam et al., "Apache Oozie: The Workflow Scheduler for Hadoop", https://www.oreilly.com/library/view/apache-oozie/9781449369910/preface01.html, First Edition, dated May 2015, 271 pages.
(Continued)

*Primary Examiner* — Ramy M Osman
(74) *Attorney, Agent, or Firm* — Duane Morris LLP

(57) ABSTRACT

Fault-tolerant and highly available configuration of distributed services including a computer-implemented method for role-based configuration discovery comprising receiving a request comprising an identifier of a role; identifying a first key, in a replica of a distributed configuration store, comprising a first value that matches the role identifier; identifying one or more other key-value pairs associated in the replica with the first key; and returning a response to an entity that sent the request comprising the value of at least one key-value pair that is specific to the role the service has. Also disclosed are techniques for log forwarding.

18 Claims, 16 Drawing Sheets

Related U.S. Application Data continuation of application No. 15/284,959, filed on Oct. 4, 2016, now Pat. No. 10,430,240.

(60) Provisional application No. 62/355,504, filed on Jun. 28, 2016, provisional application No. 62/241,024, filed on Oct. 13, 2015.

(51) Int. Cl.

| | |
|---|---|
| *G06F 9/46* | (2006.01) |
| *G06F 9/48* | (2006.01) |
| *G06F 9/445* | (2018.01) |
| *G06F 11/07* | (2006.01) |
| *G06F 11/14* | (2006.01) |
| *G06F 9/50* | (2006.01) |
| *G06F 8/71* | (2018.01) |
| *H04L 41/5054* | (2022.01) |

(52) U.S. Cl.
CPC ............... *G06F 9/465* (2013.01); *G06F 9/48* (2013.01); *G06F 9/4806* (2013.01); *G06F 9/4843* (2013.01); *G06F 9/50* (2013.01); *G06F 9/5005* (2013.01); *G06F 11/07* (2013.01); *G06F 11/0709* (2013.01); *G06F 11/14* (2013.01); *G06F 8/71* (2013.01); *H04L 41/5054* (2013.01)

(58) Field of Classification Search
CPC .......... G06F 9/4843; G06F 9/50; G06F 11/07; G06F 11/0709; G06F 11/14; G06F 8/71; H04L 67/1095; H04L 41/5054
See application file for complete search history.

(56) References Cited

U.S. PATENT DOCUMENTS

| | | | | |
|---|---|---|---|---|
| 7,627,634 B2* | 12/2009 | Hein | ............... | G06F 16/1787 709/248 |
| 7,685,109 B1 | 3/2010 | Ransil | | |
| 8,285,860 B2 | 10/2012 | McGuire | | |
| 8,335,765 B2* | 12/2012 | Sivasubramanian | ... | G06F 16/27 707/610 |
| 8,819,106 B1 | 8/2014 | Sirota et al. | | |
| 8,850,528 B2 | 9/2014 | Van Biljon et al. | | |
| 8,904,477 B2 | 12/2014 | Barton | | |
| 9,256,657 B1 | 2/2016 | Evenson | | |
| 9,521,194 B1 | 12/2016 | Gabrielson | | |
| 9,910,697 B2 | 3/2018 | DeArment | | |
| 10,073,902 B2 | 9/2018 | Kotagiri | | |
| 10,430,240 B2 | 10/2019 | DeArment | | |
| 10,846,115 B1* | 11/2020 | Bramhill | ............. | G06F 9/45558 |
| 10,990,446 B2* | 4/2021 | DeArment | .......... | H04L 67/1095 |
| 2003/0154328 A1 | 8/2003 | Henderson | | |
| 2003/0212681 A1* | 11/2003 | Kasper, II | ............... | G06F 16/27 707/999.009 |
| 2004/0044727 A1 | 3/2004 | Abdelaziz | | |
| 2004/0167912 A1 | 8/2004 | Tsui | | |
| 2004/0261082 A1* | 12/2004 | Steere | ...................... | H04L 41/06 719/318 |
| 2005/0114706 A1 | 5/2005 | DeStefano | | |
| 2005/0228711 A1 | 10/2005 | Lahey et al. | | |
| 2005/0289169 A1* | 12/2005 | Adya | ................. | G06F 11/1482 |
| 2006/0136360 A1 | 6/2006 | Gebhart | | |
| 2007/0005801 A1 | 1/2007 | Kumar | | |
| 2007/0105597 A1 | 5/2007 | Hwang | | |
| 2007/0156698 A1 | 7/2007 | Gebhart | | |
| 2007/0168336 A1 | 7/2007 | Ransil | | |
| 2007/0244937 A1* | 10/2007 | Flynn | .................. | G06F 11/2097 714/E11.073 |
| 2007/0299955 A1 | 12/2007 | Hoffman | | |
| 2008/0082641 A1* | 4/2008 | Meijer | .................... | H04L 67/56 709/220 |
| 2009/0132317 A1 | 5/2009 | Dholakia | | |
| 2009/0132710 A1 | 5/2009 | Pelley | | |
| 2009/0222808 A1 | 9/2009 | Faus | | |
| 2009/0327465 A1 | 12/2009 | Flegg et al. | | |
| 2010/0011098 A1 | 1/2010 | Sanborn | | |
| 2010/0049959 A1 | 2/2010 | Arcese | | |
| 2010/0057515 A1 | 3/2010 | Gandini et al. | | |
| 2010/0186020 A1 | 7/2010 | Maddhirala | | |
| 2010/0235525 A1 | 9/2010 | McGuire | | |
| 2011/0131448 A1 | 6/2011 | Vasil et al. | | |
| 2011/0158248 A1 | 6/2011 | Vorunganti | | |
| 2011/0185050 A1 | 7/2011 | Zeine | | |
| 2011/0302449 A1 | 12/2011 | Douceur | | |
| 2012/0011207 A1 | 1/2012 | Morris | | |
| 2012/0180068 A1 | 7/2012 | Wein et al. | | |
| 2012/0254885 A1* | 10/2012 | Cai | ........ | G06F 9/5016 718/104 |
| 2013/0041790 A1* | 2/2013 | Murugesan | ........... | G06F 9/4856 709/217 |
| 2013/0070917 A1 | 3/2013 | Nuestro | | |
| 2013/0173876 A1* | 7/2013 | Namjoshi | ........... | G06F 11/1479 711/E12.103 |
| 2014/0310328 A1 | 10/2014 | Charif et al. | | |
| 2014/0310720 A1 | 10/2014 | Song et al. | | |
| 2014/0379777 A1 | 12/2014 | Yamamoto | | |
| 2015/0172412 A1 | 6/2015 | Escriva | | |
| 2016/0094620 A1 | 3/2016 | Darling | | |
| 2016/0100004 A1* | 4/2016 | Anglin | ................. | H04L 67/1095 709/219 |
| 2016/0117376 A1* | 4/2016 | Ji | ............................. | G06F 16/27 707/625 |
| 2016/0218963 A1 | 7/2016 | Nauck | | |
| 2017/0075711 A1 | 3/2017 | Berrange | | |
| 2017/0285981 A1 | 10/2017 | De Arment | | |
| 2017/0285982 A1 | 10/2017 | De Arment | | |
| 2017/0331884 A1* | 11/2017 | Colle | ................... | H04L 67/1001 |
| 2018/0343317 A1 | 11/2018 | Lakunishok | | |
| 2018/0343321 A1 | 11/2018 | Chang | | |
| 2019/0036766 A1 | 1/2019 | Popov | | |
| 2019/0354405 A1 | 11/2019 | DeArment | | |
| 2021/0224118 A1* | 7/2021 | DeArment | .......... | G06F 11/0709 |

OTHER PUBLICATIONS

Hunt et al., "ZooKeeper: Wait-Free Coordination for Internet-Scale Systems", USENIX, The Advanced Computing Systems Asociation, https://www.usenix.org/legacy/event/usenix10/tech/full_papers/Hunt.pdf, dated May 2010, 8 pages.

Haloi, Saurav, "Apache ZooKeeper Essentials", https://www.google.com/books/edition/Apache_ZooKeeper_Essentials/Ym9uBgAAQBAJ?hl=en&gbpv=1&dq=ISBN+978-1-78439-132-4&pg=PP3&printsec=frontcover, Production reference: 1220115, dated Jan. 2015, 169 pages.

European Patent Office "Search Report", in Application No. 21168865.0-1203, dated Oct. 5, 2021, 8 pages,.

Shrivastava et al., "Architectural Support for Dynamic Reconfiguration of Large Scale Distributed Applications", dated May 4, 1998, 8 pages.

Panagiotis et al., "ACaZoo: A Distributed Key-Vale Store Based on Replicated LSM-Trees", IEEE, dated Oct. 8, 2014, 10 pages.

Ongaro, Diego, "Consensus: Bridging Theory and Practice", Redistributed by Stanford University, dated Aug. 2014, 257 pages.

Ongaro et al., "In Search of an Understandable Consensus Algorithm", (Extended Version), Stanford University, Published May 20, 2014, 18 pages.

Howard et al., "Raft Refloated: Do We Have Consensus?", University of Cambridge Computer Laboratory, dated Jan. 20, 2015, 10 pages.

European Patent Office, "Search Report" in application No. 17178290.7-1879 dated Nov. 20, 2017, 8 pages.

European Patent Office, "Search Report" in application No. 17 178 290.7-1221, dated Nov. 11, 2018, 7 pages.

European Claims in application No. 17178290.7-1879, dated Nov. 2017, 2 pages.

(56) References Cited

OTHER PUBLICATIONS

European Claims in application No. 17 178 290.7-1221, dated Nov. 2018.

* cited by examiner

US 11,706,296 B2

FAULT-TOLERANT AND HIGHLY AVAILABLE CONFIGURATION OF DISTRIBUTED SERVICES

BENEFIT CLAIM

This application claims the benefit under 35 U.S.C. § 120 as a continuation of application Ser. No. 16/528,625 filed Aug. 1, 2019, which is a continuation of application Ser. No. 15/284,959, filed Oct. 4, 2016, now U.S. Pat. No. 10,430, 240, which claims the benefit of U.S. Provisional Application No. 62/241,024, filed Oct. 13, 2015, and U.S. Provisional Application No. 62/355,504, filed Jun. 28, 2016, the entire contents of which is hereby incorporated herein by reference for all purposes as if fully set forth herein, under 35 U.S.C. § 119(e). The applicant(s) hereby rescind any disclaimer of claim scope in the parent application(s) or the prosecution history thereof and advise the USPTO that the claims in this application may be broader than any claim in the parent applications.

TECHNICAL FIELD

The present Application relates to distributed computing systems. More specifically, the example embodiment(s) of the present invention described below relate to fault-tolerant and highly available configuration of distributed services.

BACKGROUND

The first computers were largely stand-alone units with no direct connection to other computers or computer networks. Users mainly accomplished configuration of software programs installed on the computers with direct terminal access to the computers. Over time, more and more computers were connected to each other using Local Area Networks or "LANs." In both cases, maintaining proper configuration of installed software was relatively simple because the overall computing environment was limited and clearly defined.

With the ever-increasing popularity of the Internet, more and more computers are connected to larger networks. Today, the Internet provides access to vast public and private network services. Some of these network services are implemented as complex, large-scale distributed computing systems. A modern network service can involve numerous (e.g., tens or more) different software products or "applications" executing on many (e.g., hundreds or more) commodity-class computing devices in multiple data center facilities.

As more and more network services are implemented on more commodity server computing devices as opposed to fewer enterprise-class server computing devices, a whole new set of challenges face providers and operators of network services: the previously small-scale, well-understood computing environments are now large, complex N-tier distributed computer systems with relatively high host failure rates. A particular set of challenges involves maintaining the proper configuration of all of the applications that execute on the many hosts. A current approach to maintaining application configuration by having an administrator interface with each host individually (e.g., by "SSH'ing" into the host) does not scale when the number of hosts is large. Further, due to its manual and repetitive nature, the current approach can result in inconsistent or incomplete configuration that causes application downtime or otherwise improper network service operation. A new approach for maintaining the configuration of applications deployed as part of a network service that is tolerant to host failure and is more reliable and efficient than current approaches is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not by way of limitation, in the figures of the accompanying drawings and in which like reference numerals refer to similar elements and in which.

DESCRIPTION OF EXAMPLE EMBODIMENTS

Figure 1:
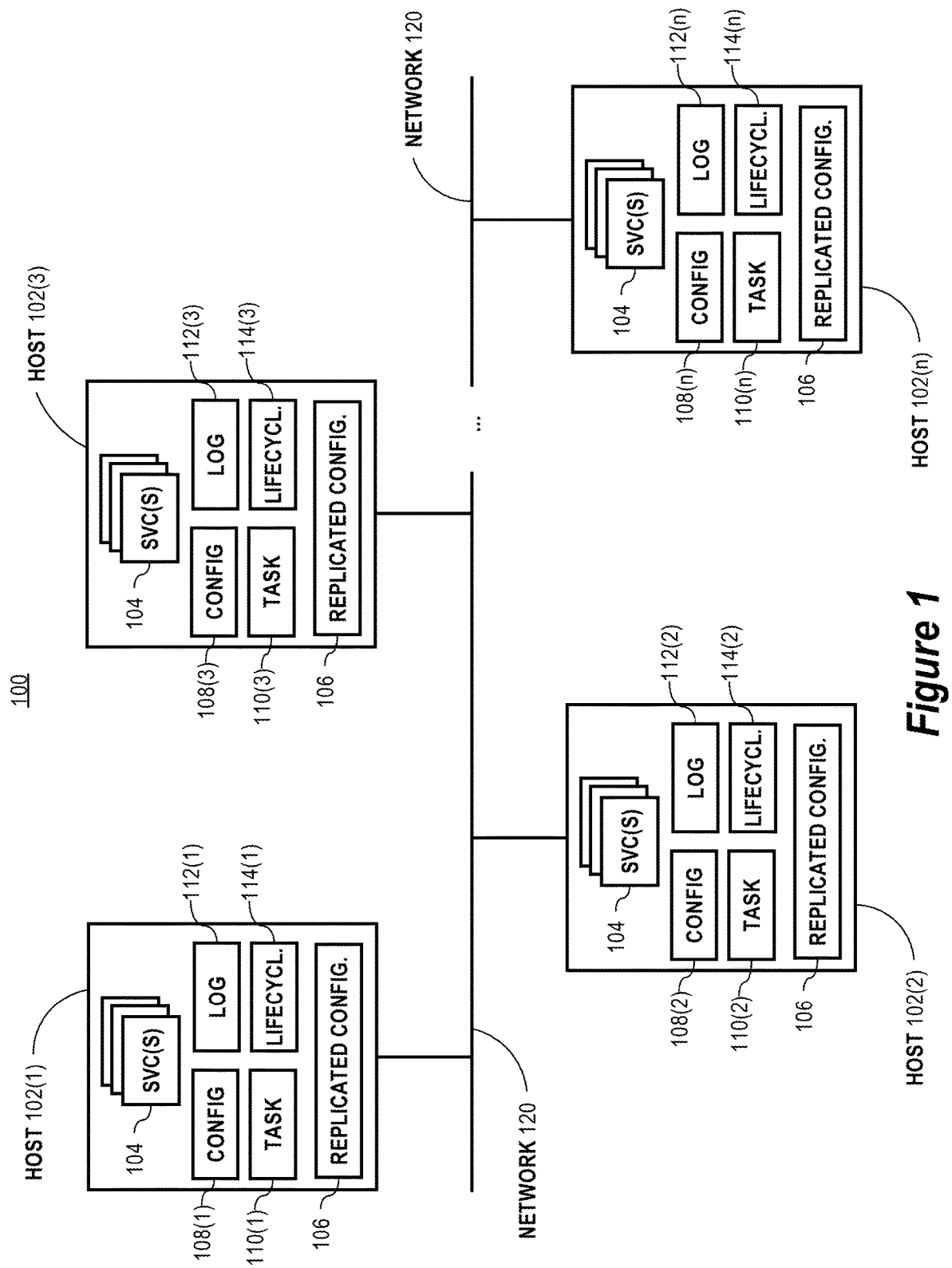
FIG. 1 is a block diagram of a system for fault-tolerant and highly available configuration of services installed on hosts in distributed computing environment, according to some embodiments of the present invention.

In the following description, for the purposes of explanation, numerous specific details are set forth in order to provide a thorough understanding of the example embodiments the present invention. It will be apparent, however, that the example embodiments may be practiced without these specific details. In other instances, well-known structures and devices are shown in block diagram form in order to avoid unnecessarily obscuring the example embodiments.

Throughout the following description, the phrase "in some embodiments," as used herein, does not necessarily refer to the same embodiments, though it may. Thus, various implementations may be readily combined, without departing from the scope or spirit of the invention.

Overview

Techniques for fault-tolerant and highly available configuration of services installed on hosts in a distributed computing environment are described. A service can be a single instance of a software product or software application installed on one or more hosts in the distributed computing environment. For example, a service might be a database server instance, a web server instance, or any other instance of a software product or a software application installed on one or more hosts. In some instances, a service is a network "server" service in that responds to network requests from other network "client" services. A server can be both a server service and a client service, or just a client service, or just a server service. Further, a service can be, but need not be, a network service. That is, a service may perform operations at one or more hosts without sending or responding to network requests.

A host can be a single computing device. For example, a host can be a single server-computing device. Alternatively, a host can be a single virtual computer instance that executes on a computing device facilitated by a virtualization layer (e.g., a Type 1 or Type 2 hypervisor) interposed between the virtual computer instance and the computing device. Regardless if a single computing device or a single virtual computer instance, a host can be configured with an operating system (e.g., UNIX, LINUX, or WINDOWS) that manages the low-level aspects of host operation including managing execution of processes, memory allocation, file input and output (I/O), and device I/O. A host may also be configured with a container platform (e.g., DOCKER) for running services within containers on the operating system.

The distributed environment can be one or more data center facilities or other computer hosting facilities connected to the Internet or other public or private network. Services that execute as processes on hosts in the distributed computing environment may be configured using the distributed configuration platform of the present invention.

According to some embodiments of the present invention, the techniques encompass a method for setting configuration information for a service. The method is performed at a computing device comprising one or more processors and memory storing one or more computer programs executed by the one or more processors to perform the method. The method includes performing operations comprising: receiving, from a process executing on the computing device, a request to set service configuration information for a service; obtaining a current configuration revision identifier for the service from a replica, stored at the computing device, of a distributed configuration store; storing the service configuration information for the service in the replica into a new revision, the new revision having a unique identifier; causing an atomic operation to be performed against the replica, the atomic operation comprising the operations of: (a) comparing a first value to a second value stored in the replica, the first value comprising the current configuration revision identifier; and (b) storing the unique identifier in the replica as a new current configuration revision identifier for the service, if the first value equals the second value. Because unique identifier of the new revision is atomically set as the new current configuration revision identifier for the service only if the current configuration revision identifier is still stored in the replica as, or as part of, the second value after setting the configuration information for the service in the replica, a more consistent view of the service's concurrent configuration information is provided at hosts in a distributed computing environment.

According to some embodiments of the present invention, the techniques include a method for distributed task orchestration. The method is performed at a computing device comprising one or more processors and memory storing one or more computer programs executed by the one or more processors to perform the method. The method includes performing operations comprising: determining, from a first replica, stored at the computing device, of a distributed configuration store, that a first host has completed a first task and set a value in the distributed configuration store indicating that the first task is complete; and initiating a second task at a second host responsive to the determining. The method facilitates automated coordination between tasks at distributed hosts.

According to some embodiments of the present invention, the configuration platform is configured to perform a method for service lifecycle management. The method is performed at a computing device comprising one or more processors and memory storing one or more computer programs executed by the one or more processors to perform the method. The method includes performing the operations of: at a computing device comprising one or more processors and memory storing one or more computer programs executed by the one or more processors to perform the method, performing operations comprising: obtaining service-host binding information from a replica, stored at the computing device, of a distributed configuration store; based on the service-host binding information, determining a current state of a particular service at the first host; using the identifier of the particular service, setting the current state of the particular service at the first host in the replica; using the identifier of the particular service, obtaining, from the replica, a target state for the particular service at the first host; using the identifier of the particular service, obtaining, from the replica, the current state of the particular service at the first host; and changing a state of the particular service at the first host, if the current state obtained from the replica is inconsistent with the target state obtained from the replica. Because the current state and the target state of the particular service is stored in the replica at the computing device, the particular service can be more reliably returned to its target state.

According to some embodiments of the present invention, the configuration platform is configured to perform a method for collecting logs generated by services at hosts. The method is performed at a computing device comprising one or more processors and memory storing one or more computer programs executed by the one or more processors to perform the method. The method includes performing the operations of: obtaining network endpoint information from a replica, stored at the computing device, of a distributed configuration store; wherein the network endpoint information identifies a location on a network of a service for collecting logs; identifying one or more logs stored at the computing device generated by a service installed at the computing device; and using the network endpoint information, providing the one or more logs to the service for collecting logs. By storing the network endpoint information in the distributed configuration store, logs generated by services at hosts can be more reliably collected and provided to a service for collecting logs in distributed computing environment.

According to some embodiments of the present invention, the techniques include a system comprising one or more processors and one or more storage media storing one or more computer programs. The one or more computer programs are configured for execution by the one or more processors. The one or more computer programs comprise instructions for performing any of the foregoing methods.

According to some embodiments of the present invention, the techniques encompass one or more non-transitory storage media storing one or more computer programs. The one or more computer programs comprise instructions which, when executed by one or more processors, cause performance of any of foregoing methods.

Distributed Computing Environment

Turning now to FIG. 1, it is a schematic diagram of a distributed computing system 100 for fault-tolerant and highly available configuration of one or more services 104 installed on a cluster of a plurality of hosts (1)-(n) (collectively, "hosts 102," or generally or singularly, "host 102") in distributed computing environment, according to some embodiments of the present invention. The distributed computing environment can be within one or more data center or other hosting facilities connected to a network such as, for example, the Internet or other network. However, the distributed computing environment is not limited to being within a data center or hosting facility environment and can be another type of distributed computing environment such as within a networked home, office, or campus. According to some embodiments, the number n of hosts 102 in the cluster at a given time is in the range of two (2) to seven (7) hosts 102 but is as a few as one (1) host 102 or more than seven (7) hosts 102 in some embodiments.

A service 104 can be a single instance of a software product or software application installed on at least one of the hosts 102. For example, a service 104 might be a database server instance, a web server instance, or any other instance of a software product or a software application installed on one or more of the hosts 102 Multiple different services 104 may be installed on the hosts 102 including multiple different services 104 on the same host 102. For example, a service 104 may be installed on multiple of the hosts 102 in a distributed, clustered, load balanced, or failover computing arrangement.

A host 102 can be a single computing device such as, for example, computing device 1400 described below with respect to FIG. 14. Alternatively, a host 102 can be a single virtual computer instance that executes on a computing device (e.g., device 1400) facilitated by a virtualization layer interposed between the virtual computer instance and the computing device. The virtualization layer can be a virtual machine monitor such as, for example, virtual machine monitor 1530 described below with respect to FIG. 15. Regardless if a single computing device or a single virtual computer instance, a host 102 can be configured with an operating system such as, for example, operating system 1510 described below with respect to FIG. 15. The operating system of a host 102 can manage low-level aspects of the host's 102 operation including managing execution of processes, memory allocation, file input and output (I/O), and device I/O. A host 102 may also be configured with a container platform (e.g., DOCKER) for running services 104 within containers on the host's 102 operating system.

The network 120 can connect the hosts 102 together within the distributed computing environment. Network 120 can actually be composed of multiple sub-networks connected together. For example, the network 120 can be an Internet Protocol Version 4-based and/or an Internet Protocol Version 6-based wired or wireless network or a combination of multiple such networks.

Replicated Configuration System

The cluster of hosts 102 can be configured with a replicated configuration system 106. In some embodiments, the replicated configuration system 106 stores and provides highly-available and fault-tolerant access to service configuration information for the services 104 installed on the hosts 102. In particular, the replicated configuration system 106 coordinates replication of data changes to the service configuration information between the hosts 102 in accordance with a consensus protocol that allows the hosts 102 to agree on an ordering for the changes even in circumstances where a host 102 in the cluster fails (e.g., crashes, suspends, hangs, or unexpectedly reboots).

Host 102 failures can be all too common, especially in highly dynamic data center environments. For example, the disk drive and server computing device failure rate may be as high as two (2) to four (4) percent (%) per year or more. Further, in modern data centers, tens of network 120 links or more may fail daily. The consensus protocol may allow the hosts 102 in the cluster to work as a group to provide a fault-tolerant and highly-available replicated configuration system 106 that can survive failure of the some of the hosts 102 in the cluster.

According to some embodiments, each host 102 in the cluster stores locally a replica of a distributed configuration store. The distributed configuration store encompasses the collection of replicas locally stored at the hosts 102. In this context, storing "locally" encompasses storing the replica persistently to an electronic, magnetic, or optical data storage mechanism that is connected to the bus of the host 102 (or the computing device on which the host 102 executes if the host 102 is a virtual computer instance) by a physical host interface (e.g., Serial Attached SCIS, Serial ATA, PCI Express, Fibre Channel, USB, or the like). For example, the data storage mechanism can be a hard disk, a solid-state drive, or an optical drive of the host 102 or the computing device on which the host 102 executes. In some embodiments, the distributed configuration store is a distributed hierarchical key-value store. Thus, each host 102 in the cluster can store locally a replica of the distributed hierarchical key-value store.

Figure 2:
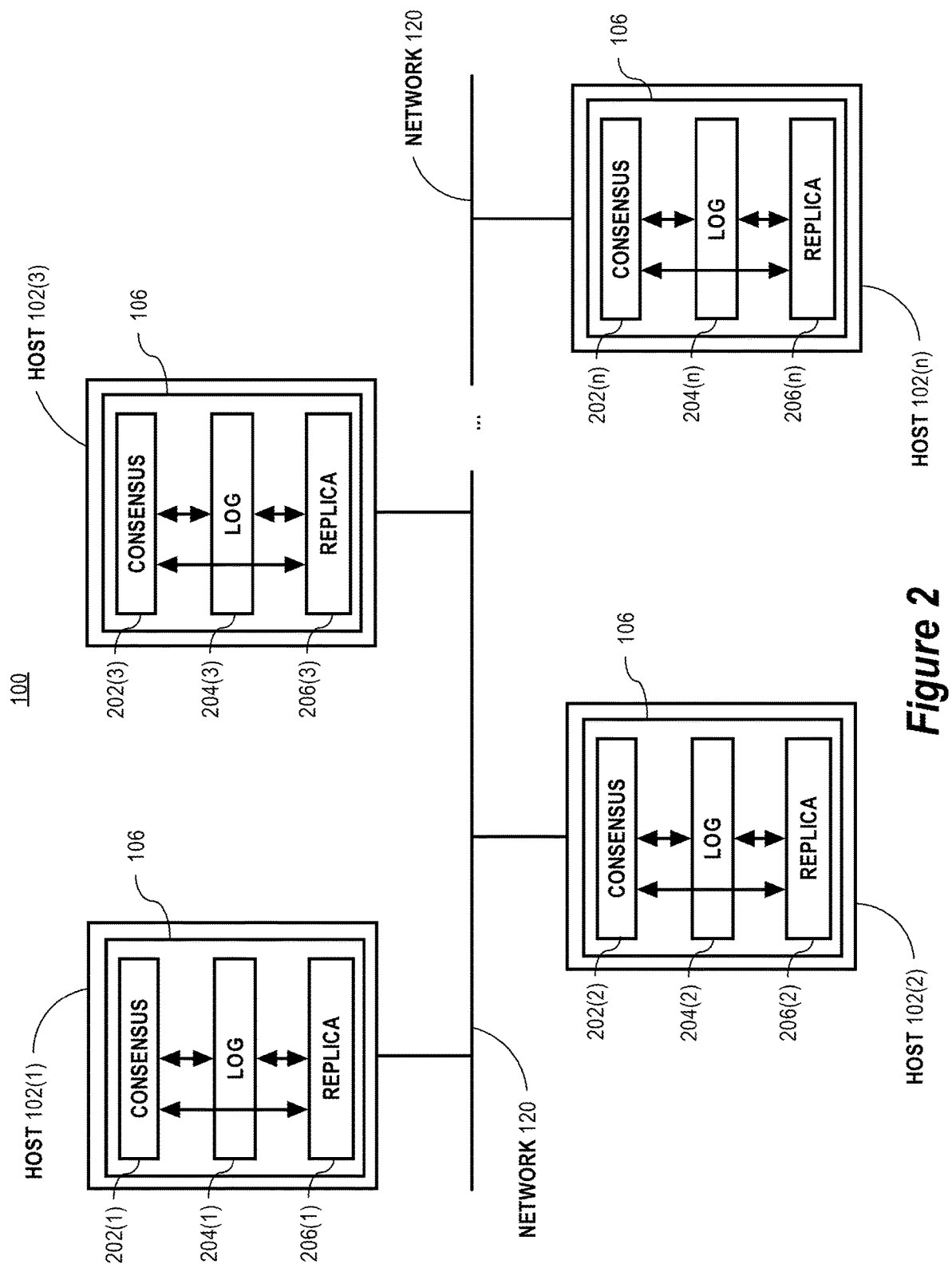
FIG. 2 is a block diagram of the system of FIG. 1 showing a replicated configuration system in detail, according to some embodiments of the present invention.

FIG. 2 depicts the replicated configuration system 106 on each of the hosts 102 in the cluster. As shown, the replicated configuration system 106 on a host 102 includes a consensus module 202 (e.g., one or more computer programs or sets of instructions), a replicated log 204, and a replica 206 of the distributed configuration store.

According to some embodiments, the replicated configuration system 106 on each of the hosts 102 in the cluster can compute an identical copy of the same service configuration information and can continue operating even if some of the hosts 102 in the cluster fail. To accomplish this, each host 102 in the cluster locally stores a replicated log 204 containing a series of data change commands.

According to some embodiments, a data change command encompasses creating one or more keys and associated values in the distributed configuration store, updating (modifying) one or more keys and associated values in the distributed configuration store, deleting (removing) one or more keys and associated values from the distributed configuration store, or some combination of creating, updating, and/or removing keys and associated values. The series of data change commands in the replicated logs 204 at the hosts 102 are respectively applied to the local replicas 206 in the same order. In particular, each replicated log 204 eventually contains the same series of data change commands in the same order such that the same sequence of data change commands is eventually processed against the local replicas 206 at each of the hosts 102. As a result, the service configuration information stored in each of the replicas 206 is eventually consistent.

According to some embodiments of the present invention, a consensus protocol is used to keep the replicated logs 204 eventually consistent. In operation, the consensus module 202 or other module of the replicated configuration system 106 at a host 102 receives data change commands from one or more services 104 or one or more service configuration modules at the host 102. In some embodiments, the service configuration modules include a configuration module 108 (e.g., one or more computer programs or sets of instructions), a task orchestration module 110 (e.g., one or more computer programs or sets of instructions), a log management module 112 (e.g., one or more computer programs or sets of instructions), and a service lifecycle module 114 (e.g., one or more computer programs or sets of instructions). For example, the consensus module 202 at a host 102 can receive a data change command from the configuration module 108 on the host 102 via a localhost network interface of the host 102. Example operation of the configuration module 108, the task orchestration module 110, the log management module 112, and the service lifecycle module 114 is described in greater detail below.

While in some embodiments, each host 102 in the cluster is configured with a configuration module 108, a task orchestration module 110, a log management module 112, and a service lifecycle module 114, a host 102 may be configured with less than all of these service configuration modules or different service configuration modules in other example embodiments. Thus, there is no requirement that each host 102 be configured with each and every or any of the service configuration modules 108, 110, 112, and 114.

In some embodiments, service configuration modules interact directly with the replicated configuration system 106 at the hosts 102. For example, a module 108, 110, 112, or 114 at a host 102 may establish a network connection with the replicated configuration system 106 at the host 102 via a localhost network interface. The module 108, 110, 112, or 114 may then send data change commands, data read commands, or other commands via the network connection for processing by the replicated configuration system 106 at the host 102.

In other example embodiments, a service configuration module (e.g., module 108, 110, 112, or 114) at a host 102 interfaces with the replicated configuration system 106 at the host 102 via an intermediary "broker" module (not shown). In this case, the service configuration module may interface directly with the broker module which in turn interfaces with the replicated configuration system 106 at the host 102. The broker module may provide an API and a request and result data format translation service to the service configuration module(s) at the host 102. For example, a module 108, 110, 112, or 114 at a host 102 may establish a local network connection with the broker module at the host 102 via a localhost network interface. The broker module 102 at the host 102 may in turn establish a local network connection with the replicated configuration system 106 at the host 102 via the localhost network interface. The module 108, 110, 112, or 114 may then send requests to the broker module via the local network connection between the broker module and the module 108, 110, 112, or 114. Upon receiving the request, the broker module may translate the request into a command that is sent via the local network connection between the broker module and the replicated configuration system 106 at the host 102. The broker module may translate command results received from the replicated configuration system at the host 102 into a data format suitable for consumption by a requesting service configuration module. The data format may be, for example, a JavaScript Object Notation (JSON) format, an eXtensible Markup Language (XML) format, or other data interchange or serialized data format.

By using a broker module, the service configuration module(s) at a host 102 need not be specially configured to interface directly with the replicated configuration system 106 at the host 102. This in turn allows more service configuration modules like modules 108, 110, 112, and 114 to be deployed at the hosts 102 without requiring special configuration of the service configuration modules to interface directly with the replicated configuration system 106. Using a broker module also allows flexibility in choice of type of replicated configuration system 106 without requiring special configuration of the service configuration modules to interface with a particular type of replicated configuration system 106.

The consensus modules 202 add received data change commands to their respective replicated logs 204. The consensus modules 202 communicate with each other over network 120 to ensure that every replicated log 204 eventually contains the same data change commands in the same order, even if some of the hosts 102 fail. Once a data change command is properly replicated among at least a majority of the replicated logs 204 in the cluster, the data change command is sometimes said to be "committed" from the perspective of the replicated configuration system 106. Committed data change commands are processed in replicated log 204 order at each of the hosts 102. As a result, the hosts 102 appear to form a single, highly reliable view of the service configuration information of the services 104 installed on the hosts 102.

The consensus protocol used to ensure eventually consistent replicas 206 at the hosts 102 may have the following properties, in some embodiments of the present invention. For one, the consensus protocol may never result in returning an incorrect result in the face of network 120 delays, partitions, packet loss, duplication, or re-ordering. For another, the consensus protocol may be fully functional (e.g., available) so long as a majority of the hosts 102 in the cluster are operational and can communicate with each other over the network 120. For example, the consensus protocol can tolerate a failure of any two hosts 102 in a five-host cluster. Further, the consensus protocol may allow a failed host 102 to recover its replica 206 from local storage and rejoin the cluster. For another, the consensus protocol may maintain safety under an asynchronous model in which network messages and processors proceed at different speeds. For example, the consensus protocol may not depend on timing to ensure the eventually consistency of the replicated logs 204. At worst, faulty clocks and extreme network message delays cause only availability problems, but do not compromise the integrity of eventual consistency of the logs 204. In a typical case, the consensus protocol allows the consensus module 202 at a host 102 to respond to a client that requests a data change command that the requested data change command is successfully complete as soon as the data change command is stored in the replicated logs 204 of at least a majority of the hosts 102 in the cluster.

According to some embodiments, the consensus protocol is based on the known "Raft" consensus protocol. Additional information on the Raft consensus protocol can be found in the paper by Diego Ongaro and John Ousterhout, "In Search of an Understandable Consensus Algorithm (Extended Version)," Stanford University, May 20, 2014. While the Raft consensus protocol is used in some embodiments, other consensus protocols are used in other example embodiments. For example, another possible consensus protocol that can be used is the "Paxos" consensus protocol. Additional information on the Paxos consensus protocol can be found in the paper by Leslie Lamport, "The part-time parliament," ACM Transactions on Computer Systems, 16(2):133-169, May 1998.

Distributed Configuration Store Module

According to some embodiments, the replicated configuration system 106 at each host 102 includes a distributed configuration store module. The distributed configuration store module at a host 102 provides a low-level interface (e.g., an API) for performing operations against the replicated configuration system 106 at the host 102. Such operations may include setting the value of a key in the replicated configuration system 106, getting the value of a key in the replicated configuration system 106, changing the value of a key in the replicated configuration system 106, and deleting a key and its associated value from the replicated configuration system 106. The distributed configuration store module may also provide for other low-level key space operations. For example, the distributed key-value store module may allow a client process to set a watch on a key such that the client process is notified by a long-polling mechanism when the value of the watched key changes in the replicated configuration system 106. The distributed key-value store may also support an atomic compare-and-swap operation which sets the value of a key to a value specified by a client only if client-provided conditions are equal to current conditions. According to some example embodiment of the present invention, the distributed configuration store module and the distributed configuration store are implemented by the "etcd" distributed key-value store. Additional information on etcd is available on the Internet at/etcd in the coreos.com Domain.

The distributed configuration store module at a host 102 may support different types of "watches" on a key. In one type, referred to herein as a "forward" watch, after a watch is set on a key, the client process is notified of subsequent changes to the watched key in the distributed configuration store while the watch is set on the key. In another type, referred to herein as a "historical and forward" watch, when a historical and forward watch is set on a key, the client process specifies an index value or timestamp indicating a point a time in the past. When a historical and forward watch is set on a key, the client process is immediately notified of changes to the watched key that have occurred after the point in time the past and up and until the time the watch is set. In addition, after a historical and forward watch is set on a key, the client process is notified of subsequent changes to the watched key in the distributed configuration store while the watch is set on the key. A forward watch or a historical and forward watch can watch for changes just to the key itself or for changes to the key and any descendant keys of the watched key. The later type of watch is sometimes referred to as a recursive watch.

In this description, unless otherwise clearly apparent in context, when referring to write operation in which a value is written to the replicated configuration system 106, such reference means that the value is committed to the distributed configuration store of the replicated configuration system 106 in accordance with the consensus protocol. For example, a write of a key-value to the replicated configuration system 106, if successful, means that the key-value is also written to a quorum (e.g., a majority) of the replicated logs 204 in the cluster of hosts 102.

In this description, unless otherwise clearly apparent in context, when referring to a read operation in which a value is read from the replicated configuration system 106, such reference means that the value read can be (but is not necessarily) stale with respect to a more current value that exists in distributed configuration store. For example, the current value may be stored in one or more replicated logs 204 at one or more other hosts 102. A benefit to tolerating stale reads is that a value can be read from a local replica 206 even if a quorum of hosts 102 does not exist in accordance with the consensus protocol in use.

According to some embodiments, the distributed configuration store module at a host 102 is implemented as part of the consensus module 202 at the host 102. However, the distributed configuration store module at a host 102 may be implemented as a separate module of the replicated configuration system 106 at the host 102.

With the above-system environment in mind in which a replicated configuration system 106 is installed on a cluster of a plurality of hosts 102 and that uses a consensus protocol to provide a highly available and fault-tolerant distributed configuration store, some examples embodiments of the present invention that leverage the system environment will now be described.

Deployment Model

According to some embodiments of the present invention, a configuration module 108 executes at each host 102 in the cluster. The configuration module 108 at a host 102 provides an application programing interface (API) to services 104 executing on the host 102 for reading and writing service configuration information from and to the replicated configuration system 106.

According to some embodiments, the services 104 on a host 104 invoke the API of the configuration module 108 in a Representational State Transfer (REST) style using the HyperText Transfer Protocol (HTTP) or the Secure-HyperText Transfer Protocol (HTTPS). However, the example embodiments are not limited to REST-style invocation and other invocation styles may be used. Nor are the example embodiments limited to the HTTP or HTTPS protocols and other application layer protocol may be used.

According to some embodiments, for added security, the API of the configuration module 108 is available to services 104 at a host 102 only on a localhost network interface of the host 102.

By using the replicated configuration system 106, all hosts 102 in the cluster can eventually have the same view of service configuration information in the replicas 206 on the hosts 102. Also by using the replicated configuration system 106, each host 102 has local access to service configuration information even if other hosts in the cluster are unavailable. As opposed to a system in which service configuration information for services 104 is stored at a single host or a single set of hosts on the network 120, the replicated configuration system 106 makes service configuration information eventually locally available at each of the hosts 102 in the cluster, thereby making the service configuration information more highly available.

According to some embodiments of the present invention, the API offered by the configuration module 108 on a host 102 to services 104 at the host 102 encompasses at least two fundamental operations for managing service configuration information: GET and SET. Both the GET and SET operations accept the identifier of a service 104 that is the subject of the GET or SET operation. The identifier of the service may be specified to the GET and SET operations as a character string such as, for example, 'gemini', to refer to a particular service named "gemini."

According to some embodiments, the GET operation returns the current service configuration information stored in the replicated configuration system 106 for the specified service. For example, the GET operation may return a JSON value comprising the current service configuration information for the specified service. An example JSON value returned by the GET operation might be the character string:

'{'host': 'host-123.provider.tld', 'port': '8080', 'thread count': '8', 'RAM': '512'}'

According to some embodiments, the SET operation, in addition to a service 104 identifier, accepts one or more keys and one or more associated values representing new current service configuration information for the specified service. If successful, the SET operation results in the new current service configuration information for the specified service being stored in the replicated configuration system 106. The new current service configuration information may be specified as a JSON formatted character string such as, for example, the character string:

'{'host': 'host-123.provider.tld', 'port': '8080', 'thread count': '8', 'RAM': '512'}'

As illustrated by the above example, the service configuration information for a service 104 may be distributed over multiple keys in the replicated configuration system 106. For example, the service configuration information for the "gemini" service 104 might be distributed over the following four keys in the replicated configuration system 106:

'/services/gemini/host'
'/services/gemini/por'
'/services/gemini/thread count'
'/services/gemini/RAM'

In the above-example, a hierarchical key space is used to store the service configuration information for services in the replicated configuration system 106 for organizational purposes. For example, keys with the top-level key 'services' are distinguished from keys that have different top-level keys (e.g., 'hosts'). Further, keys with the top-level key 'services' but with a second-level key that is not 'gemini' (e.g., with a second-level key that is the name of a different service) are distinguished from the above-example keys for the "gemini" service.

The above-example is just one example of a possible hierarchical key space and other key spaces may be used according to requirements of the particular implementation at hand. For example, the hierarchical key space for keys that store service configuration information in the distributed key value store may have more than the three levels. For example, a possible hierarchical key space may have a stacks level, followed by a service group level, followed by a services level, and then the service configuration information at the leaf level. In this context, a service group refers to a named group of one or more services and a stack refers to a named group of one or more service groups. For example, the "gemini" service may belong to a service group named "auth" (short for "authentication and authorization") and the "auth" service group may belong to a stack named "prod" (short for "production"). In this case, the service configuration information for the "gemini" service 104 might be distributed over the following four keys in the replicated configuration system 106:

'/services/prod/auth/gemini/host'
'/services/prod/auth/gemini/port'
'/services/prod/auth/gemini/thread count'
'/services/prod/auth/gemini/RAM'

Transaction Protocol

From the perspective of the replicated configuration system 106, each write of a single key to the replicated configuration system 106 may be atomic. This includes creating the key with an initial value or modifying the key with a new value. However, multiple writes of multiple keys may not be atomic. In other words, the replicated configuration system 106 may not support transactions involving multiple key writes to the replicated configuration system 106 such that in the event of a system failure during an attempt to write the multiple keys to the replicated configuration system 106 either a) all of the multiple keys are successfully written to the replicated configuration system 106 or b) none of the multiple keys are successfully written to the replicated configuration system 106, but in no case are some but not all of the multiple keys successfully written to the replicated configuration system 106. Thus, if the configuration module 108 fails to successfully perform a write of a key to the replicated configuration system 106 when processing a SET operation request involving multiple key writes, the service configuration information for a service 104 in the replicated configuration system 106 could be in an incorrect state. In the worst case, because of the incorrect state, the service 104 is not able start or operates improperly because the service 104 is unable to obtain valid service configuration information from the replicated configuration system 106. For example, an unexpected failure to one or both of the configuration module 108 or the replicated configuration system 106 at a host 102 during a SET operation may cause only some but not all of the four keys in the above-example for the "gemini" service 104 to be stored in the replicated configuration system 106. As a result, when the "gemini" service 104 begins execution and requests a GET operation of the configuration module 108 on a host 102 to obtain the current service configuration information for the "gemini" service 104, the current service configuration information for the "gemini" service 104 returned by the configuration module 108 could be incomplete or incorrect.

Another issue is that it is possible for the service configuration information for the same service to be SET differently at the same time at two different hosts. For example, a service 104 may invoke the SET operation of the configuration module 108(1) at host 102(1) to store new current service configuration information for the "gemini" service 104 at the same time a service 104 invokes the SET operation of the configuration module 108(3) at host 102(3) to store different new current service configuration information for the "gemini" service 104. Depending on the exact order the multiple key writes as decided upon according to the consensus protocol in use, the replicated configuration system 106 may end up storing service configuration information for the "gemini" service 104 that is inconsistent or incorrect.

According to some embodiments, to address the foregoing issues, the configuration module 108 implements a transaction protocol. The transaction protocol ensures that for a certain SET operation processed by the configuration module 108 to set new current service configuration information for a particular service, a certain subsequent GET operation provides a consistent view of the current service configuration information stored in the replicated configuration system 106 for the particular service. The certain SET and GET operations can be performed at the same hosts 102 or at different hosts 102. The certain SET operation can be one in which multiple keys are to be written to the replicated configuration system 106 for the particular service. The certain GET operation can be a request for the current configuration for the particular service after the certain SET operation is processed. According to some embodiments the transaction protocol, the configuration module 108 will return, as a result of the certain GET operation, the multiple keys requested to be written by the certain SET operation only if the configuration module 108 is able to successfully write all of the multiple keys to the replicated configuration system 106 when processing the certain SET operation and the current service configuration information for the particular service did not change while the configuration module 108 was processing the SET operation.

According to some embodiments of the present invention, implementation of the transaction protocol by a configuration module 108 at a host 102 involves storing separately identifiable revisions of the service configuration information for services 104. In particular, when the SET operation of the configuration module 108 at a host 102 is invoked to store new current service configuration information for a "target" service 104 in the replicated configuration system 106, the new current service configuration information is assigned a unique configuration revision identifier (or just "revision identifier"). The assigned revision identifier can be unique just for the target service 104 or unique for all services 104 for which service configuration information is stored in the replicated configuration system 106. The configuration module 108 sets the assigned revision identifier as the new current revision identifier for the target service 104 in the replicated configuration system 106 only if the existing current revision identifier is still the current revision identifier for the target service 104 after the configuration module 108 successfully writes the new service configuration information to the replication configuration system 106 into the assigned revision identifier. If the current revision identifier for the target service 104 has changed in the interim, then the configuration module 108 at the host 102 does not set the assigned revision identifier as a new current revision identifier for the target service 104, thereby ensuring consistent changes to the service configuration information for the target service 104.

Setting New Current Service Configuration Information

Figure 3A:
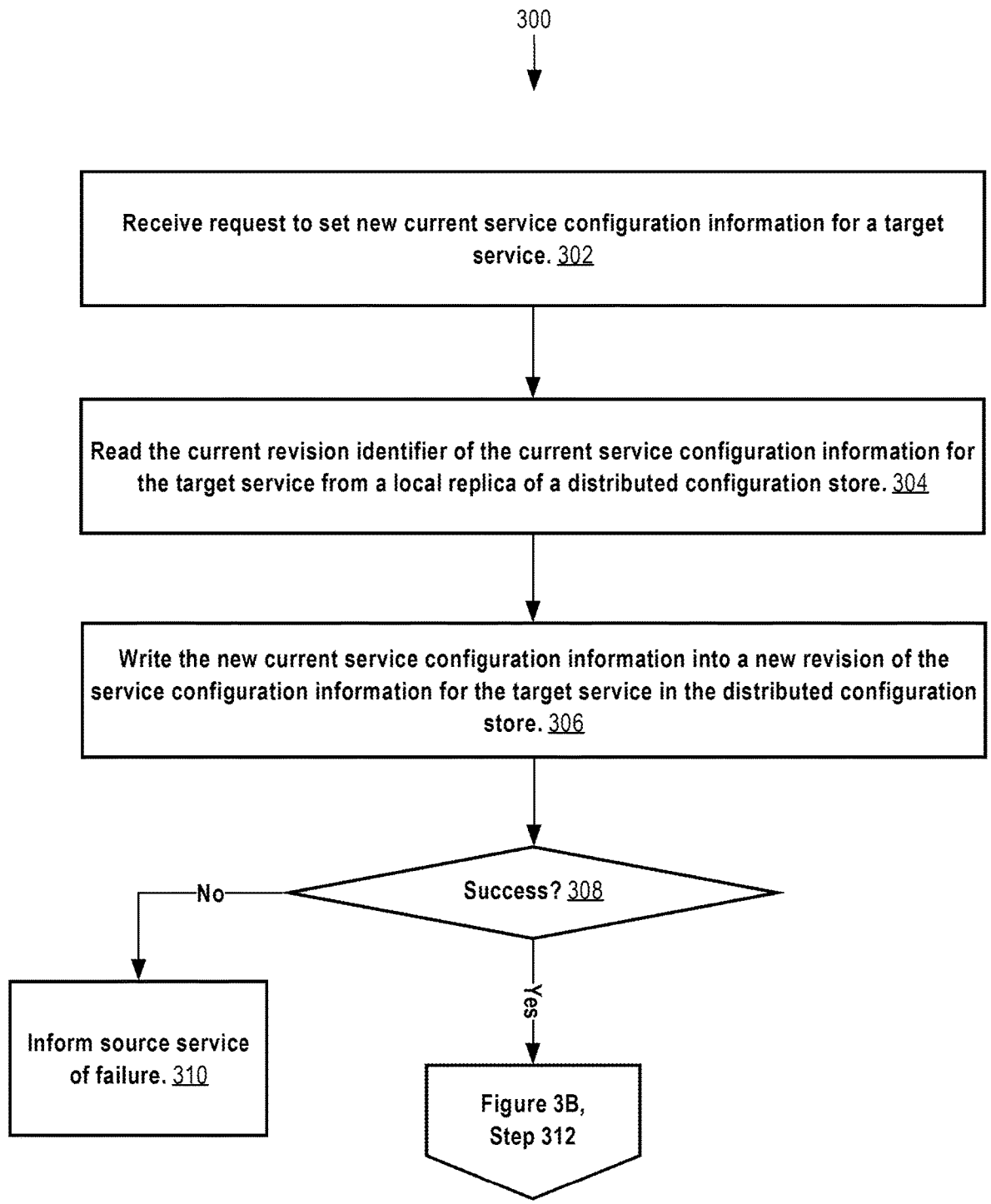
FIGS. 3A and 3B together are a flowchart of a process for setting the current service configuration information for a service, according to some embodiments of the present invention.
Figure 3B:
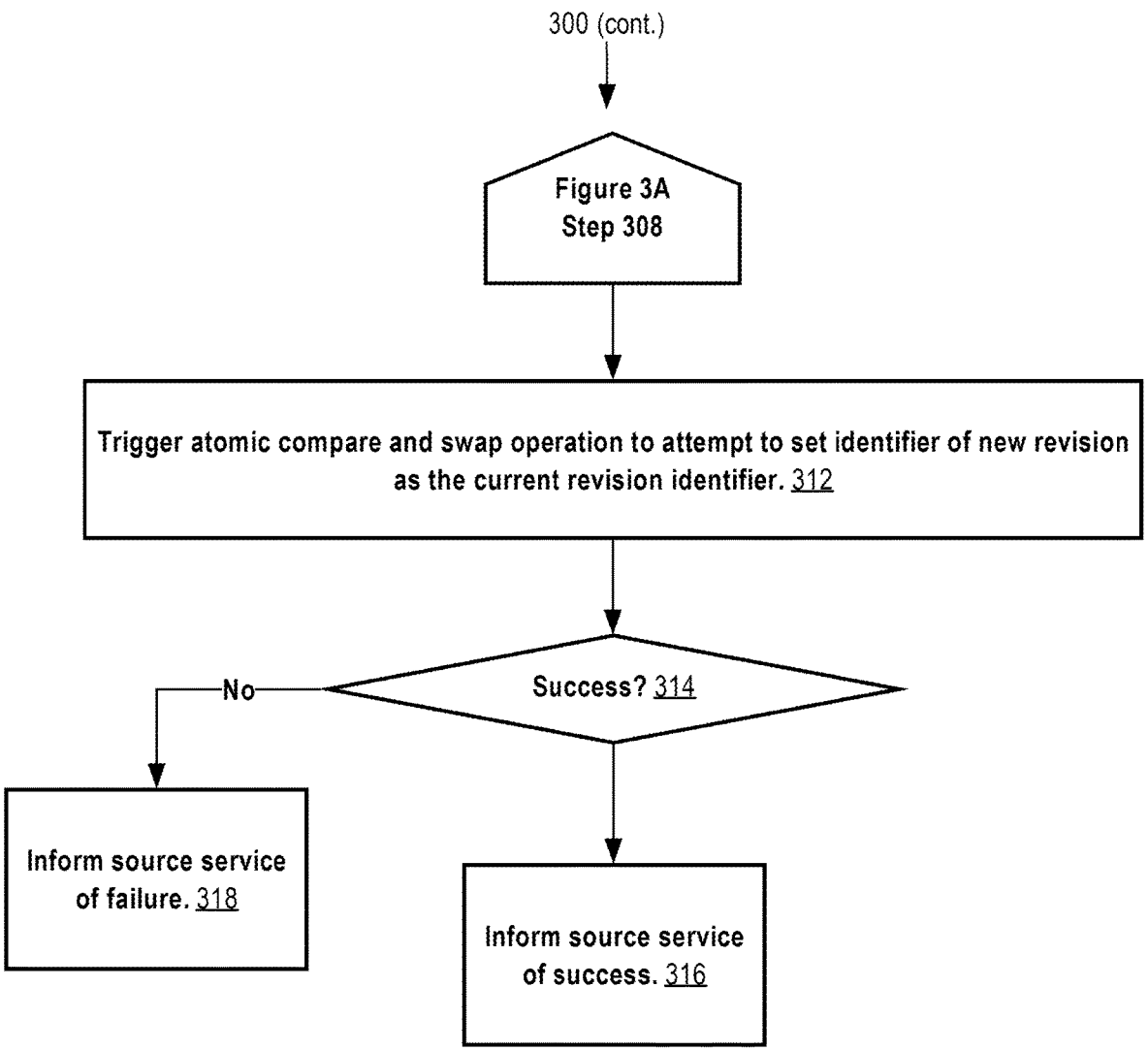

The transaction protocol according to some examples embodiments will now be illustrated by an example and with reference to FIGS. 3A and 3B. FIGS. 3A and 3B together illustrate a process 300 for setting new current service configuration information for a service 104. The process 300 is described below as being performed by a configuration module 108 executing on a host 102 in accordance with some embodiments. However, in other example embodiments, the process 300 is performed by the replicated configuration system 106 at the host 102 and/or a broker module at the host 102, in addition to or instead of the configuration module 108 on the host 102.

At step 302, the configuration module 108 receives a request to store new current service configuration for a "target" service 104. The request may be received from a "source" service 104 executing on the host 102, or a "source" service 104 executing on another host 102, if such over the network 120 requests are permitted according to the requirements of particular implementation at hand. The source service 104 may be the same service as the target service 104 or a different service than the target service 104. The target service 104 may or may not execute on the same host 102 on which the source service 104 executes. Indeed, according to some embodiments, at least in part because of the transaction protocol, new current service configuration information is stored in a local replica 206 at a host 102 in a consistent manner and a consistent view of that new current service configuration information is eventually made available at the local replicas 206 at the other hosts 102 in the cluster.

According to some embodiments, for extra security, the configuration module 108 receives the request to store the service configuration information via a localhost network interface of the host 102.

According to some embodiments, the request from the configuration service 108 includes at least two request parameters. A first request parameter specifies the target service 104 for the new service configuration information. A second request parameter specifies the new current service configuration information. The target service 104 may be specified in the request by a character string identifier of the target service 104 such as, for example, 'gemini'. The new current service configuration information may be specified as a set of one or more key-value pairs in which the key and the value of a key-value pair may be a character string value. For example, a key-value pair might have a key of 'host' and a value of 'myhost'. In a possible scenario, the second parameter includes a plurality of key-value pairs representing the new current service configuration information for the target service 104.

In response to receiving the request to set new current service configuration for the target service 104, the configuration module 108, at step 304, reads the current value of a "configuration revision index" key (or just "revision index key") as stored in the replicated configuration system 106. The value of the revision index key, if present in the replicated configuration system 106, stores the current revision identifier for each of one or more known services 104, which may include the target service 104.

According to some embodiments, the value of the revision index key is formatted in a machine and human readable format such as, for example a JavaScript Object Notation (JSON), eXtensible Markup Language (XML), or the like. For example, the revision index key may have a predefined key name within the hierarchal key space of the replicated configuration system 106. The value of the revision index key is composed of a set of one or more key-value pairs. Each key-value pair may specify an identifier of a known service 104 as the key and the current revision identifier for that known service 104 as the value. For example, the revision index key value might include the key-value pair {'gemini': '14'} where 'gemini' is a character string representation of the name of a service 104 and '14' is the current revision identifier for the "gemini" service 104.

The revision index key value may store more than one key-value pair, one for each of multiple known services. Alternatively, there may be multiple differently named revision index keys, one for each of multiple known services, stacks, or service groups. In this alternative, each of the multiple revision index keys stores the current revision identifier for just one known service 104, stack, or service group. Also in this case, the value may be a just character string value such as '14', as opposed to a JSON or XML formatted character string value.

At step 306, the key-value pair(s) of the new current service configuration information for the target service 104 is/are written to the replicated configuration system 106 into a new revision for the target service 104. However, even if the new current service configuration is successfully written into a new revision, in accordance with the transaction protocol, the written information does not actually become the current service configuration information for the target service 104 until the revision index key for the target service 104 is successfully updated with the revision identifier assigned to the new revision, as described herein.

Writing the key-value pairs of the new service configuration information into the new revision can involve causing the keys of the key-value pairs to include the assigned revision identifier in the keys when stored in the replicated configuration system 106. The assigned revision identifier may be based on a monotonically increasing counter maintained by the replicated configuration system 106.

For example, at step 302, the configuration module 108 at a host 102 may receive the following SET request, expressed in JSON format:

'{'service': 'gemini', 'config': {'host': 'host-123.provider.tld', 'port': '8080', 'thread count': '8', 'RAM': '512'}}'

In this SET request, the target service 104 is identified as 'gemini' and the new current service configuration information to store in the replicated configuration system 106 for the "gemini" service 104 includes the set of key-value pairs: '{'host': 'host-123.provider.tld', 'port': '8080', 'thread count': '8', 'RAM': '512'}'.

Continuing the example, at step 304, the current revision identifier of the "gemini" service 104 stored as, or as part of, the value of the revision index key in the replicated configuration system 106 for the target service 104 might be '14'. Accordingly, the following keys might exist in the replicated configuration system 106:

'/services/gemini/14/host'
'/services/gemini/14/port'
'/services/gemini/14/thread count'
'/services/gemini/14/RAM'

Here, the revision identifier '14' is part of the key as stored in the replicated configuration system 106, thereby identifying the keys as for revision '14' of the service configuration information for the "gemini" service 104. The service name, in this example "gemini," is included in the hierarchical key space.

In accordance with step 306, the key-value pairs of the new service configuration information for the "gemini" service 104 are written to the replicated configuration system 106 into a new revision of the service configuration information for the target service 104. For example, the new revision may be indicated by assigned revision identifier for the "gemini" service 104. For example, at step 306, the following key-value pairs may be written to the replicated configuration system 106:

'{'/services/gemini/19/host': 'host-123.provider.tld'}'
'{'/service/gemini/19/port': '8080' }'
'{'/service/gemini/19/thread count': '8'}'
'{'/service/gemini/19/RAM': '512'}'

In this example, the revision identifier for the new revision is '19'. Note that it is not a requirement that revision identifiers for a particular service be ordered, just that they uniquely identify the keys that belong to a particular revision of service configuration information for a service. Nonetheless, a unique, monotonically increasing number that is incremented on changes to the replicated configuration system 106 is used in some embodiments for revision identifiers.

At step 308, a determination is made whether all of the key-values of the new current service configuration information for the target service 104 were successfully written to the replicated configuration system 106 into the new revision. If not, then, at step 310, the source service 104 is informed that the SET operation failed, and the process 300 ends. One the other hand, if it is determined at step 308 that the new current service configuration information for the target service 104 was successfully written to the replicated configuration system 106 into a new revision at step 306, then, at step 312, an atomic compare and swap operation is performed against the replicated configuration system 106 to update the revision index key value with the revision identifier assigned to the new revision of the service configuration information for the target service 104.

At step 314, a determination is made whether the atomic compare and swap operation at step 312 succeeded. If the atomic compare and swap operation is successful, then the assigned revision identifier for the new revision becomes the new current revision identifier for the target service 104 and the process 300 successfully completes and the source service 104, at step 316, is informed of the success. If the atomic compare and swap operation is unsuccessful, then, at step 318, the SET operation fails and the source service 104 is informed of the failure.

According to some embodiments, the atomic compare and swap operation is successful only if the current revision identifier for the target service 104 as stored as, or as part of, the value of the revision index key has not changed in the replicated configuration system 106 since it was read from the replicated configuration system 106 at step 302.

For example, at step 302, the following revision index key value may be read from the replicated configuration system 106 as the following character string:

'{'gemini': '14', 'alpha': '4', 'beta': '16'}'

Here, the revision index key value read from the replicated configuration system 106 specifies that the current configuration revision identifier for the "gemini" service 104 is '14', among other current configuration revision identifiers for other services 104 named "alpha" and "beta."

Assuming new service configuration for the "gemini" service 104 is successfully written to the replicated configuration system 106 at step 306 into revision '19', then, at step 312, an atomic compare and swap operation is performed to swap the current value of the revision index key in the replicated configuration system 106 with the character string value '{'gemini': '19', 'alpha': '4', 'beta': '16'}' only if the current value of the revision index key in the replicated configuration system 106 still equals the character string value '{'gemini': '14', 'alpha': '4', 'beta': '16'}'.

Atomicity of the compare and swap operation may be guaranteed by the replicated configuration system 106. Thus, as a result of causing the atomic compare and swap operation, the new service configuration information written into revision 19 for the "gemini" service 104 actually becomes the current service configuration information for the "gemini" service 104 only if the current service configuration information for any of the "gemini", "alpha", and "beta" services 104 has not been changed in the replicated configuration system 106 since the revision index key value was read at step 302. The atomic compare and swap operation will also fail if service configuration information for a new service has been added or if one or more of the existing services is deleted as reflected in a changed revision index key value.

As mentioned previously, a revision index key value can store a current configuration revision identifier for just one service 104 or store current configuration revision identifiers for multiple services 104. If for just one service 104, then the process 300 provides service configuration consistency for just the one service 104. In particular, concurrent changes to the current service configuration information for other services 104 do not affect whether the atomic compare and swap operation at step 312 for the target service 104 succeeds or fails. On the other hand, if the revision index key value stores current revision identifiers for multiple services 104 including the target service 104, then the atomic compare and swap operation at step 312 will fail for the target service 104 if the current service configuration information for any of the multiple services 104 is changed concurrently at another host 102. Thus, by having a single revision index key value store current revision identifiers for multiple services 104, the process 300 ensures that changes to the current service configuration information for the multiple services 104 are consistent with each other. This may be useful, for example, if the multiple services 104 are dependent on each other when executing in the distributed computing environment such as, for example, if the multiple services 104 belong to the same stack or service group.

Getting Current Service Configuration Information

Figure 4:
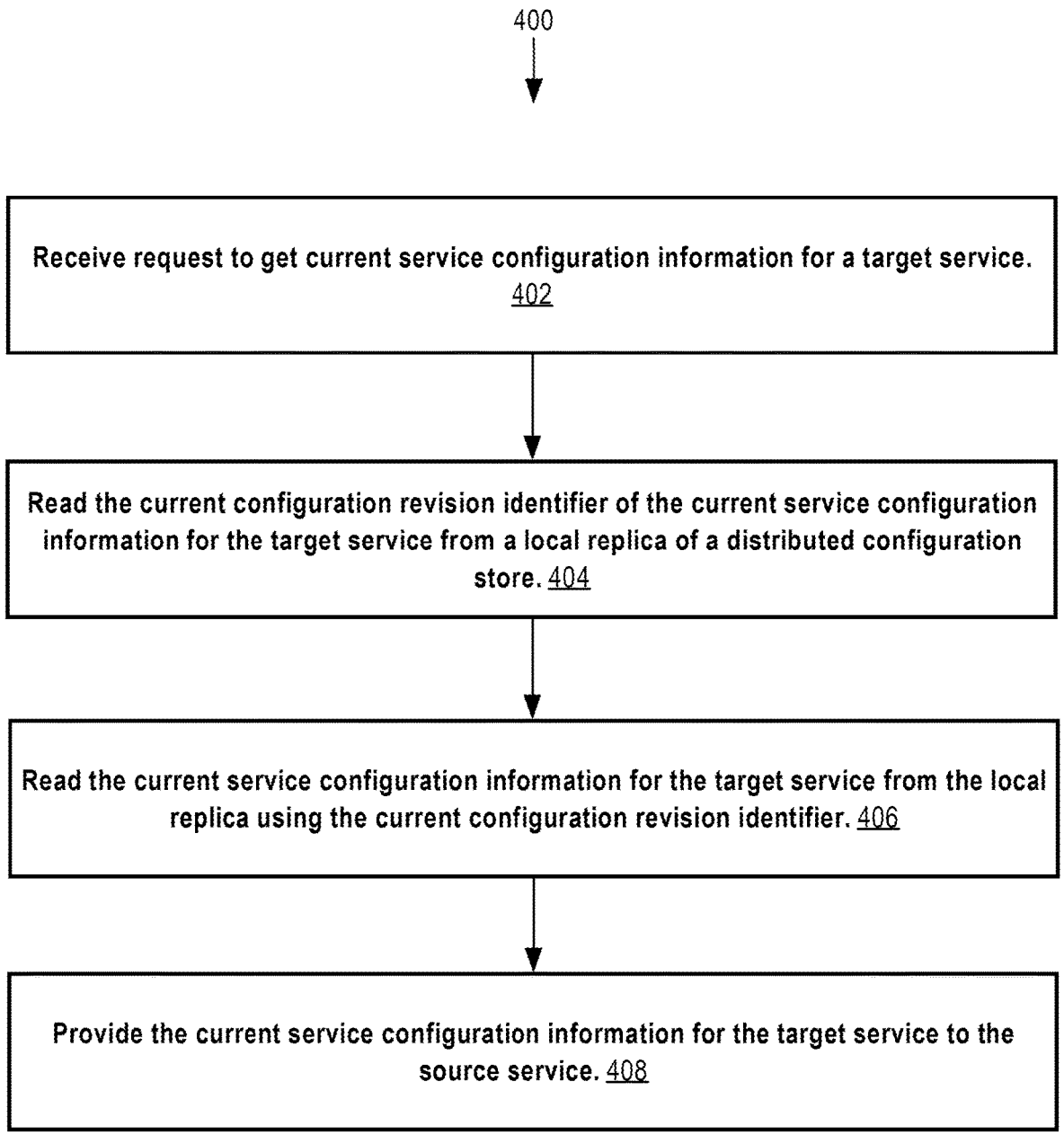
FIG. 4 is a flowchart of a process for getting the current service configuration for a service, according to some embodiments of the present invention.

Turning now to FIG. 4, is a flowchart of a process 400 for getting the current service configuration information for a target service 104. The process 400 is described below as being performed by a configuration module 108 executing on a host 102 in accordance with some embodiments. However, in other example embodiments, the process 400 is performed by the replicated configuration system 106 at the host 102 and/or a broker module at the host 102, in addition to or instead of the configuration module 108 on the host 102.

At step 402, the configuration module 108 receives a request to get the current service configuration for a "target" service 104. The request may be received from a "source" service 104 executing on the host 102, or a "source" service 104 executing on another host 102, if such over the network 120 requests are permitted according to the requirements of particular implementation at hand. The source service 104 may be the same service as the target service 104 or a different service than the target service 104. The target service 104 may or may not execute on the same host 102 on which the source service 104 executes.

According to some embodiments, for extra security, the configuration module 108 receives the request to get the current service configuration information for the target service 104 via a localhost network interface of the host 102.

According to some embodiments, the request from the configuration service 108 includes at least one request parameter. A first request parameter specifies the target service 104 for which the current service configuration information is requested. In other example embodiments, a name of a stack to which the service belongs is also provided as a request parameter in addition to the service name. The target service 104 may be specified in the request by a character string identifier of the target service 104 such as, for example, the character string 'gemini'.

Next, at step 404, the value of the revision index key that stores the current revision identifier for the target service 104 is read from the local replica. For example, the value might be '19' or '{'gemini': '19', 'alpha': '4', 'beta': '16'}', depending on whether the revision index key value stores the current revision identifier for just the target service 104 or for multiple services 104, one of which is the target service 104. If the target service 104 belongs to a stack, then the value might be, for example, '{'prod': {'gemini': '19', 'alpha': '4', 'beta': '16'}, . . . [other stacks]}', where 'prod' refers to the name of the stack to which the "gemini" service belongs.

Next, at step 406, the current revision identifier for the target service 104 obtained at step 404 is used to read the current service configuration information for the target service 104 from the replicated configuration system 106. Reading the current service configuration information can include reading a particular revision of the service configuration information for the target service 104 from the replicated configuration system 106 identified by the current revision identifier for the target service 104 obtained at step 404.

For example, if the current revision identifier for the target service 104 is '19', then reading the current service configuration information for the target service 104 from the replicated configuration system 106 might involve reading the values of the following keys from the replicated configuration system 106:

'/services/gemini/19/host'
'/services/gemini/19/port'
'/services/gemini/19/thread count'
'/services/gemini/19/RAM'

As an alternative, if the gemini service belongs to a stack (e.g., "prod"), then reading the current service configuration information for the target service 104 from the local replica 206 might involve reading the values of the following keys from the replicated configuration system 106:

'/services/prod/gemini/19/host'
'/services/prod/gemini/19/port'
'/services/prod/gemini/19/thread count'
'/services/prod/gemini/19/RAM'

Next, at step 408, the current configuration information read at step 406 is provided to the source service 104 as a return value to the request made at step 402. For example, the current configuration information read at step 406 might be provided as the JSON formatted character string: '{'host': 'host-123.provider.tld', 'port': '8080', 'thread count': '8', 'RAM': '512'}'.

Distributed Task Orchestration

According to some embodiments, a distributed state machine for configuring services 104 is provided. The distributed state machine may be used to configure services 104 in a fault-tolerant manner.

For example, a distributed database service 104 may be installed on hosts 102(1), 102(2), and 102(3). The distributed database service 104 might be the APACHE CASSANDRA distributed database service 104, for example. One administrative task commonly performed by distributed database services 104 is database backup. For example, a data snapshot of the distributed database service 104 may be captured by executing one or more commands (e.g., 'nodetool snapshot') at each of the hosts 102(1), 102(2), and 102(3), which may be performed in parallel at the hosts.

Consider another backup example involving more than one service 104. In particular, an overall backup task might involve the steps to be performed serially of: (Step 1) backing up a relational database service 104 at a host 102(1), then (Step 2) backing up a distributed database service 104 at three hosts 102(2), 102(3), and 102(3), and then finally (Step 3) obtaining from another service 104 a snapshot time value from that represents a time of a last change to the distributed database after the backup.

According to some embodiments, the distributed state machine allows these backup tasks and other tasks to be automatically performed in a fault-tolerant manner, as described below.

According to some embodiments, a distributed task to be orchestrated by the distributed state machine is conceptually modeled as a directed acyclic graph (DAG) comprising nodes and directed edges. Each node in the DAG represents a step of the distributed task. A directed edge between two nodes in the DAG represents a task dependency of one step on another step. For example, the DAG of the above-example backup distributed task might have three nodes representing (Step 1), (Step 2), and (Step 3), described above, respectively. A directed edge from the node representing (Step 3) to the node representing (Step 2) represents the distributed task dependency of (Step 3) on (Step 2). Another directed edge from the node representing (Step 2) to the node representing (Step 1) represents the distributed task dependency of (Step 2) on (Step 1).

According to some embodiments, the DAG of a distributed task is stored in the replicated configuration system 106 as the value of a versioned "pending tasks" key. The pending tasks key may have a well-known name within the key space of the replicated configuration system 106 such as, for example, '/tasks/pending'.

The specification of a new distributed task may be written to the replicated configuration system 106 as the value of a unique version of the pending tasks key. The unique version assigned to the new distributed task may be reflected in the key name. For example, the specification of a new distributed task might be written to the replicated configuration system 106 as the value of the key '/tasks/pending/18', where '18' is the unique version.

Distributed Task Specification

Figure 5:
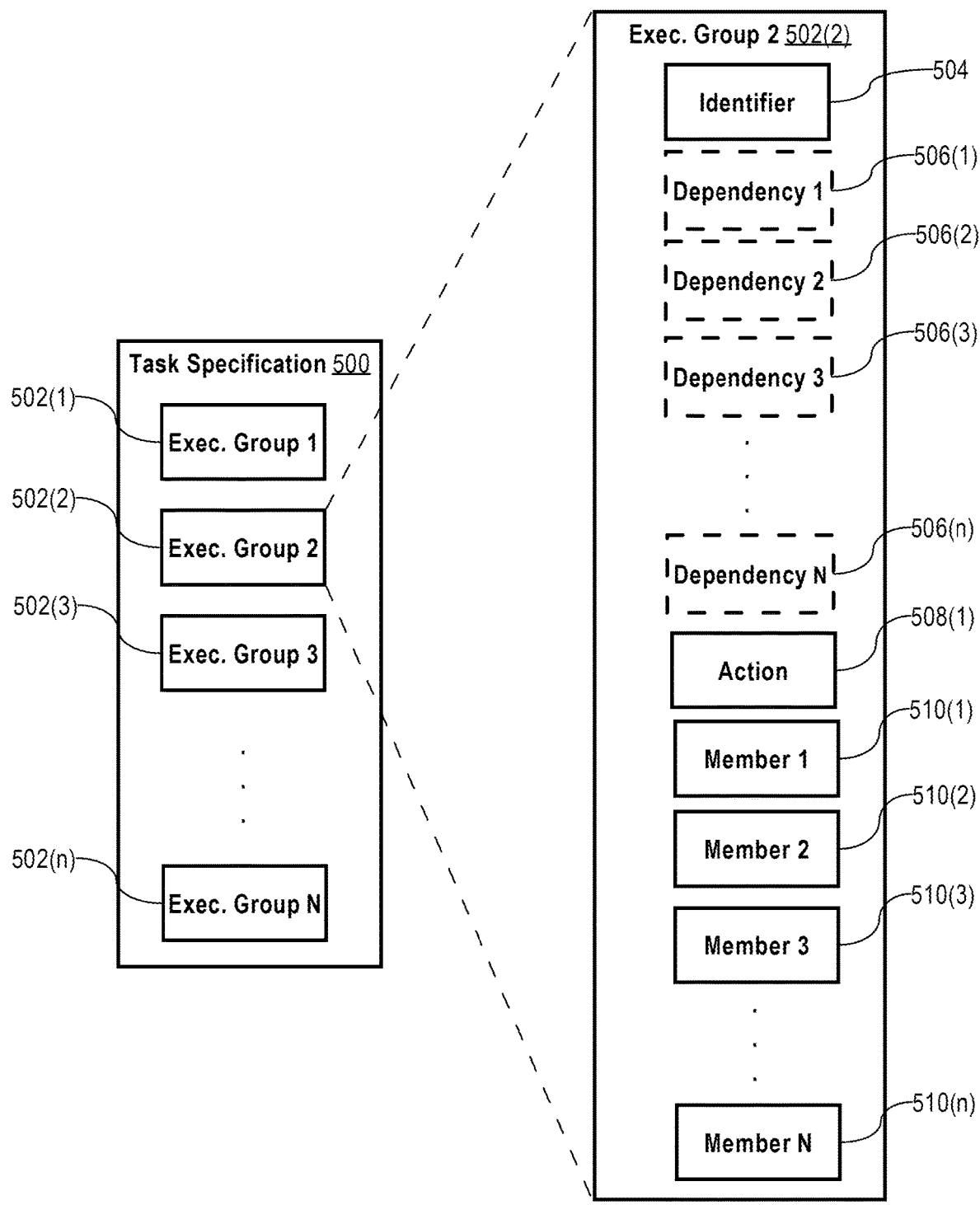
FIG. 5 is a block diagram of a specification of a distributed task, according to some embodiments of the present invention.

Turning now to FIG. 5, it is a block diagram of a specification 500 of a new distributed task that may be stored as the value of a unique pending tasks key in the replicated configuration system 106, according to some embodiments of the present invention. In some embodiments, the value is stored in the replicated configuration system 106 as a JSON, XML, or other machine and human-readable formatted character string value.

As shown, a specification 500 may contain a list of one or more execution groups 502(1)-(n). Each execution group 502 may correspond to a step of a distributed task. Or conceptually, each execution group 502 may correspond to a node of a DAG representing the distributed task.

As exemplified by execution group 502(2), each execution group 502 has a unique identifier 504 of that execution group 502, unique at least among the execution groups 502 of the specification 500. The unique identifier 504 may be a unique character string value, for example.

Optionally, each execution group 502 may also have a list of one or more execution group dependencies 506(1)-(n). If present in an execution group 502, the list of execution group dependencies specifies one or more execution group identifiers 504 of one or more other execution groups 502 of the specification 500 that the execution group 502 has a task dependency on. If an execution group 502 has a task dependency on one or more other execution groups 502, then the task represented by dependent execution group 502 is not performed by the distributed state machine unless and until the task(s) represented by the one or more other execution groups 502 have successfully completed. In some embodiments, an empty list is included in the execution group 502 to specify that the execution group has no task dependencies.

Each execution group 502 may also have an action 508. The action 508 contains the instructions representing the task to be performed for that execution group. For example, the instructions can be an executable script (e.g., a shell script), program (e.g., a Python program or other executable program), one or more command lines, or other set of computer-executable programs, instructions, or commands.

Execution group 502 may also specify a list of one or more members 510(1)-(n) that belong to that execution group 502. Each member 510 identifies a host 102 at which the action 508 of the execution group 502 is to be executed. For example, a member 510 may identifier a host 102 by its hostname, network address or other information suitable for identifying a host 102.

Starting a Distributed Task

Figure 6:
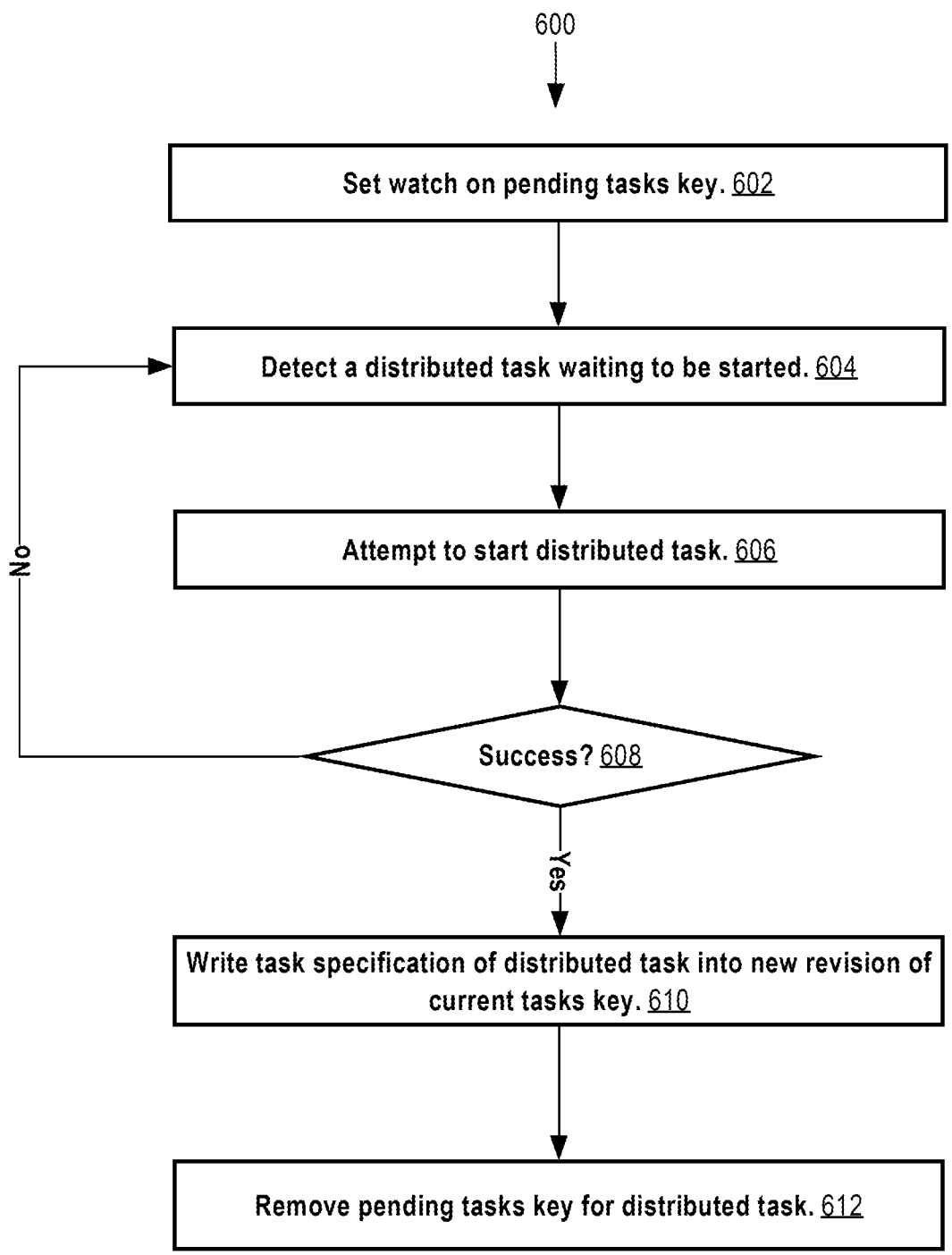
FIG. 6 is a flowchart of a process for orchestrating a distributed task, according to some embodiments of the present invention.

According to some embodiments, writing a distributed task specification 500 into a unique version of the pending tasks key into the replicated configuration system 106 sets the state of the distributed task to "pending start" in the distributed state machine. Turning now to FIG. 6, it is a flowchart of a process 600 for orchestrating a distributed task after the distributed task has placed into the pending start state, according to some embodiments of the present invention.

The process 600 is described below as being performed by a task orchestration module 110 executing on a host 102 in accordance with some embodiments. However, in other example embodiments, the process 600 is performed by the replicated configuration system 106 at the host 102 and/or a broker module at the host 102, in addition to or instead of the task orchestration module 110 on the host 102.

At step 602, the task orchestration module 110 at one or more hosts 102 in the cluster watches for changes to the pending tasks key in the replicated configuration system 106 at the host 102. In particular, the task orchestration module 110 at a host 102 watches for the addition of a version of the pending tasks key that represents a distributed task to be started. For example, a version of the pending tasks key may be added to a local replica at a host 102 in the cluster and then replicated to the other hosts 102 in the cluster by the replicated configuration system 106. For example, at step 602, the task orchestration module 110 at one or more hosts 102 in the cluster might watch for changes to the key '/tasks/pending'.

The watch set at step 602 can be a forward watch or a historical and forward watch. The watch set at step 602 may also be a recursive watch, but need not be. In particular, if a host 102 fails or the task orchestration module 110 at a host 102 fails, upon restart, the task orchestration module 110 at the host 102 can capture via the historical and forward watch any changes to the current tasks key that occurred while the task orchestration module 110 or the host 102 were offline. If a historical and forward watch is set, the point in time in the past specified by the task orchestration module 110 when the watch is set may be, for example, up to the past one thousand (1,000) modifications to the replicated configuration system 106.

At step 604, the task orchestration module 110 at a first host 102 detects a distributed task waiting to be started. For example, the task orchestration module 110 at the first host 102 may detect the key '/tasks/pending/18' in its local replica 206, where '18' represents a version of the pending tasks key. The value of the version of the pending tasks key may be a distributed task specification 500 for a distributed task waiting to be started. The version of the pending tasks key may have been added to the replicated configuration system 106 at one of the hosts 102 in the cluster and then replicated to the remaining hosts 102 by the replicated configuration system 106.

At step 606, the task orchestration module 110 at the first host 102 attempts to start the distributed task detected at step 604. If multiple task orchestration modules 110 at multiple hosts 102 in the cluster set a watch on the pending tasks key in step 602, then only one of the multiple task orchestration modules 110 is guaranteed to successfully start the distributed task. This is accomplished according to some embodiments by performing an atomic compare and swap operation to add a predefined "started" key to the replicated configuration system 106 for the distributed task. According to some embodiments, the predefined key name is 'started' and is under the key representing the new version of the pending tasks key detected at step 604. However, other key names are possible according to the requirements of the particular implementation at hand.

For example, assume at step 604, the task orchestration module 110 at the first host 102 detects the key '/tasks/pending/18', representing a version of the pending tasks key and representing a distributed task. Then, at step 606, the task orchestration module 110 at the first host 102 may attempt an atomic compare and swap operation against the replicated configuration system 106 at the first host 102 to attempt to atomically add the started key '/tasks/pending/18/started' for the distributed task. The atomic compare and swap operation is successful only if (a) the version of the pending tasks key exists in the replicated configuration system 106 (e.g., '/tasks/pending/18' exists) and (b) the started key does not exist in the replicated configuration system 106 (e.g., '/tasks/pending/18/started' does not exist). If the version of the pending tasks key (e.g., '/tasks/pending/18') no longer exists in the replicated configuration system 106 when the task orchestration module 110 at the first host 102 attempts the atomic compare and swap operation, then this indicates that another task orchestration module 110 at another host 102 successfully started the distributed task. If, on the other hand, the started key (e.g., '/tasks/pending/18/started') does exist in the replicated configuration system 106 when the task orchestration module 110 at the first host 102 attempts the atomic compare and swap operation, then this indicates that another task orchestration module 110 at another host 102 is currently attempting to start the distributed task.

According to some embodiments, the started key (e.g., '/tasks/pending/18/started') is added to the replicated configuration system 106 with a time to live (TTL) value such that the added started key is automatically removed by the replicated configuration system 106 from the replicated configuration system 106 upon expiration of the time to live, if the added started key is not expressly removed before expiration. The TTL value represents an amount of time that the task orchestration module 110 at the first host 102 has to successfully start the distributed task. According to some embodiments, the TTL value is approximately 10 seconds, but may be more or less according to requirements of the particular implementation at hand. According to some embodiments, the value of the started key is the hostname or other identifier of the host 102 that successfully adds the started key for the distributed task (e.g., the host name or other identifier of the first host 102).

At step 608, a determination is made whether the atomic compare and swap operation at step 606 to add the started key for the distributed task was successful. Such determination may be made based on a return value from the replicated configuration system 106 at the first host 102. For example, the atomic compare and swap operation to add the started key '/tasks/pending/18/started' to the replicated configuration system 106 may be successful if (a) the version of the pending tasks key exists in the replicated configuration system 106 (e.g., '/tasks/pending/18' exists) and (b) the started key does not exist in the replicated configuration system 106 (e.g., '/tasks/pending/18/started' does not exist). Conversely, if (a') the version of the pending tasks key does not exist in the replicated configuration system 106 (e.g., '/tasks/pending/18' does not exist) or (b') the started key does exist in the replicated configuration system 106 (e.g., '/tasks/pending/18/started' exists), then the atomic compare and swap operation will be unsuccessful.

If it is determined at step 608 that the atomic compare and swap operation was not successful, then the task orchestration module 110 at the first host 102 may return again to step 604.

In some embodiments, the task orchestration module 110 continuously watches for changes to the pending tasks key and spawns a new thread or process for each distributed task detected at step 604. In this case, one or more steps 606, 608, 610, and 612 may be performed for each detected distributed task in a separate thread or process dedicated to attempting to start the new distributed task.

In some embodiments, instead of returning to step 604 upon determining that the atomic compare and swap operation was unsuccessful, the task orchestration module 110 at the first host 102 may return to step 606 to attempt to start the distributed task again after waiting for a period of time. For the example, the length of the period of time may be equal to or greater than the TTL set on the started key (e.g. '/tasks/current/18/started'). The task orchestration module 110 may return to step 606 to attempt to start the distributed task again in case another task orchestration module 110 at another host 102 that may be currently attempting to start the distributed task fails in that attempt.

The task orchestration module 110 at the first host 102 may loop over steps 604, 606 and 608 until the distributed task is successfully started or until a threshold number of unsuccessful iterations over that loop is completed.

If the atomic compare and swap operation is successful at step 606, then at step 610, the task orchestration module 110 at the first host 102 attempts to write the specification 500 of the distributed task to the replicated configuration system 106 by execution group 502 so as to signal the members 510 of the specification 500 to begin executing their respective tasks. In particular, separate keys are written for each execution group 502 of the specification 500 under a "current tasks" key in the replicated configuration system 106.

For example, assume the specification 500 of a distributed task is represented by the following JSON formatted character string stored as the value of the version of the pending tasks key '/tasks/pending/18':

```
'{
  'execution_groups' : [
    {
      'id' : 'A',
      'dependencies' : [ ],
      'action' : <instructions or reference instructions to be executed at member(s) in execution group C>,
      'members': ['host-1']
    },
    {
      'id':'B',
      'dependencies' : ['A']
      'action' : <instructions or reference instructions to be executed at member(s) in execution group C>,
      'members': ['host-2','host-3','host-4'],
    },
    {
      'id':'C',
      'dependencies' : ['B'],
      'action' : <instructions or reference instructions to be executed at member(s) in execution group C>,
      'members' : ['host-1']
    }
  ]
}'
```

In the above-example, there are three execution groups 502 'A', 'B', and 'C' and four members 510 'host-1', 'host-2', 'host-3', and 'host-4' of the execution groups 502. According to some embodiments, writing the above specification 500 to keys of the replicated configuration system 106 by execution group 502 results in the all of the following key-value pairs in the replicated configuration system 106, or a subset or superset thereof:

'{'/tasks/current/39/A/dependencies': [ ]} '
'{'/tasks/current/39/A/action': <instructions or reference to instructions to be executed at member(s) of execution group A>}'
'{'/tasks/current/39/A/members': ['host-1' ]}'
'{'/tasks/current/39/A/host-1': false}'
'{'/tasks/current/39B/dependencies': ['A']}'
'{'/tasks/current/39B/action': <instructions or reference to instructions to be executed at member(s) of execution group B>}'
'{'/tasks/current/39/C/members':['host-2', 'host-3', 'host-4']}'
'{'/tasks/current/39/A/host-2': false}'
'{'/tasks/current/39/A/host-3': false}'
'{'/tasks/current/39/A/host-4': false}'
'{'/tasks/current/39/C/dependencies': ['B']}'
'{'tasks/current/39/C/action': <instructions or reference to instructions to be executed at member(s) of execution group C>}'
'{'/tasks/current/39/C/members': ['host-1']}'
'{'/tasks/current/39/C/host-1': false}'

In this example, '/tasks/current' is the current tasks key and '39' is a particular revision of the current tasks key. Thus, the specification 500 of a new distributed task may be written to a unique revision (e.g., '39') of the current tasks key (e.g., '/tasks/current').

As illustrated by the above example, for each member in each execution group, a task complete key may also be written to the replicated configuration system 106 for that member with a value indicating that the corresponding task of the execution group has not yet been completed by that member. For example, for execution group B in the above-example which has three members named "host-1", "host-2", and "host-3", the following three key-value pairs are written:

'{'/tasks/current/39B/host-2': false}'
'{'/tasks/current/39B/host-3': false}'
'{'tasks/current/39B/host-4': false}'

The name of the task complete key for a member of an execution group may have other key names that may be based on the member identifier according to the requirements of the particular implement at hand. For example, a task complete key could just as easily be, for example, '/tasks/current/39/A/host-4_complete' or '/tasks/current/39/A/host-4 done'.

At this point, if the specification 500 of the new distributed task is successfully written to a unique revision of the current tasks key as described above, then the distributed task has been started and is now in the started state of the distributed state machine. At step 612, to indicate to other task orchestration modules 110 at other hosts 102 that the distributed task has been started, the pending tasks key for the distributed task (e.g., '/tasks/pending/18') is removed from the replicated configuration system 106. This also removes the started key for the distributed task (e.g., '/tasks/pending/18/started'). As a result, no other task orchestration modules 110 at other hosts 102 will attempt to start the distributed task again.

Executing a Distributed Task

Figure 7:
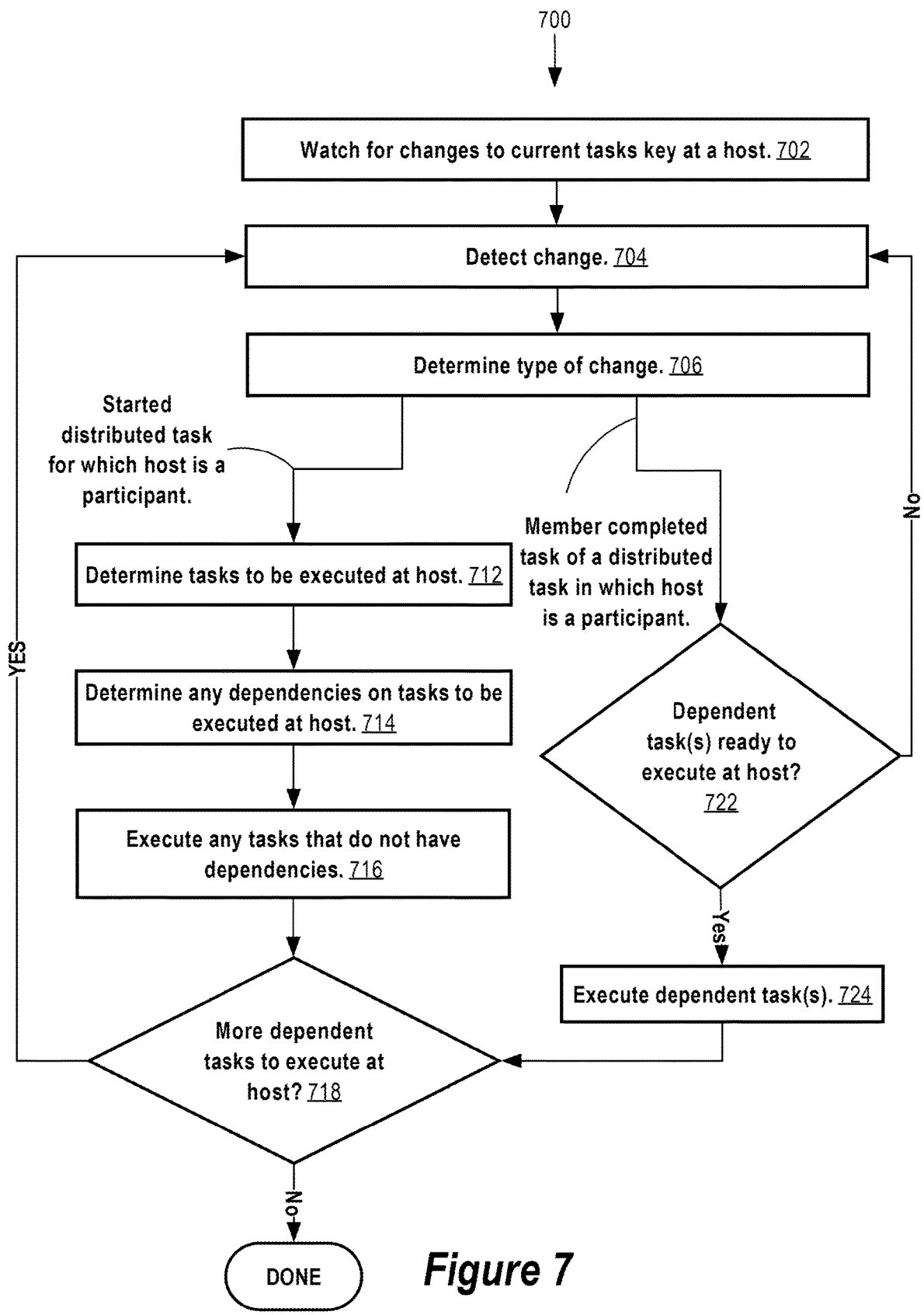
FIG. 7 is a flowchart of a process for orchestrating a distributed task, according to some embodiments of the present invention.

Turning now to FIG. 7, it is a flowchart of a process 700, according to some embodiments of the present invention, for executing a distributed task after the distributed task has been placed into the started state according to process 600 described above.

The process 700 is described below as being performed by a task orchestration module 110 executing on a host 102 in accordance with some embodiments. However, in other example embodiments, the process 700 is performed by the replicated configuration system 106 at the host 102 and/or a broker module at the host 102, in addition to or instead of the task orchestration module 110 on the host 102.

At step 702, the task orchestration module 110 at a host 102 watches for changes to the current tasks key (e.g., '/tasks/current'). In particular, the task orchestration module 110 watches for at least two types of changes.

A first type of change is the addition of a new distributed task that has entered the started state and for which the host 102 is listed as a member 510 of at least one execution group 502 of the distributed task specification 500. In this case, the host 102 is considered to be a "participant" in the distributed task. For example, if host 102(1) is identified by the hostname "host-1", then the task orchestration module 110 at host 102(1) may watch for the addition of a new revision of the current tasks key in which "host-1" is listed as a member 510 of at least one execution group 502 in the specification 500 written into the new revision. For example, returning to the example above, if host 102(1) is identified by the hostname "host-1", then the task orchestration module 110 at host 102(1) may determine that host 102(1) is a participant in the distributed task specified by the specification 500 written into revision '39' of the current tasks key (e.g., '/tasks/current').

A second type of change the task orchestration 110 at a host 102 may watch for is changes to the values of the task completion keys for distributed tasks for which the host 102 is a participant. For example, returning again to the example above, if the task orchestration module 110 at host 102(1)

has determined that host 102(1) is a participant in the distributed task specified by the specification 500 written into revision '39' of the current tasks key '/tasks/current', then the task orchestration module at host 102(1) may watch for changes to any of the following keys:

'/tasks/current/39B/host-2'
'/tasks/current/39/B/host-3'
'/tasks/current/39/B/host-4'

The watch set at step 702 can be a forward watch or a historical and forward watch. The watch set at step 702 may also be a recursive watch. A historical and forward watch may be used to provide fault-tolerance. In particular, if a host 102 fails or the task orchestration module 110 at a host 102 fails, upon restart, the task orchestration module 110 at the host 102 can capture via the historical and forward watch any changes to the current tasks key that occurred while the task orchestration module 110 or the host 102 were offline. If a historical and forward watch is set, the point in time in the past specified by the task orchestration module 110 when the watch is set may be, for example, up to the past one thousand (1,000) modifications to the replicated configuration system 106.

At step 704, a change to the current tasks key is detected and a step 706 a determination is made of what type of change was made. If it is determined that the change made is the first type of change, then, at step 712, a determination is made of what tasks are to be executed at the host 102. For example, returning to the example above, assuming host 102(1) is identified by the hostname "host-1", then the task orchestration module 110 at host 102(1) may determine that task "A" and task "C" are to be executed at host 102(1).

Next, at step 714, a determination is made whether there are any task dependencies on the tasks to be executed at the host 102. For example, the task orchestration module 110 at host 102(1) may determine that task "A" does not have any task dependencies and that task "C" has a task dependency on task 'B'.

Next, at step 716, the host 102 executes any tasks for which there are no task dependencies. For example, the task orchestration module 110 at host 102(1) may execute the action of task "A" but not "C" because task "C" has a task dependency on task "B". After successfully executing a task, the host 102 changes the value of its task completion key in the replicated configuration system 106 to indicate that the task is complete. For example, after successfully executing the action of task "A", the task orchestration module 110 at host 102(1) may change the value of the key '/tasks/current/39/A/host-1' in the replicated configuration system 106 at host 102(1) to true. This change is then replicated to the other hosts 102 in the cluster by the replicated configuration system 106.

If there are more dependent tasks to execute at the host 102 (e.g., task "C"), then, at step 718, the process 700 returns to step 704 when the next change to the current tasks key is detected. On the other hand, if there are no more dependent tasks to execute at the host 102, then the host 102 has completed its task(s) of the distributed task.

Returning to step 706, if instead it is determined that the change made to the current tasks key is the second type of change, then, at step 722, a determination is made whether any dependent tasks are now ready to execute at the host 102 as a result of the change. For example, the task orchestration module 110 at host 102(1) may determine that task "C" is now ready to execute because the values of all of the following keys for task "B" on which it has a task dependency are now set to true:

'/tasks/current/39/B/host-2'
'/tasks/current/39/B/host-3'
'/tasks/current/39/B/host-4'

If no dependent tasks are ready to execute at the host 102 as a result of the change, then the process 700 returns to step 704 when the next change to the current tasks key is detected. However, if one or more dependent tasks are now ready to execute at the host 102, then the actions of those dependent task(s) are executed at the host 102 at step 724. For example, the task orchestration module 110 at host 102(1) may execute the action of task "C" if its determines at step 722 that task "B" has completed at each of the hosts "host-1", "host-2", and "host-3".

After successfully executing a task, the host 102 changes the value of its task completion key in the replicated configuration system 106 to indicate that the task is complete. For example, after successfully executing the action of task "C", the task orchestration module 110 at host 102(1) may change the value of the key '/tasks/current/39/C/host-1' in the replicated configuration system 106 at host 102(1) to true.

If there are more dependent tasks to execute at the host 102, then, at step 718, the process 700 returns to step 704 when the next change to the current tasks key is detected. On the other hand, if there are no more dependent tasks to execute at the host 102, then the host 102 has completed its task(s) of the distributed task.

Process 600 may be performed at one or more hosts 102 in the cluster to start new distributed tasks in a fault-tolerant and automated manner. Process 700 may be performed at a plurality of hosts 102 to execute distributed tasks in a fault-tolerant and automated manner. Together processes 600 and 700 provide a mechanism for fault-tolerant and reliable execution of distributed tasks in a distributed computer system.

Service Lifecycle Management

Services 104 installed can be in various different states at different times. For example, a service 104 can be stopped, starting, running, or stopping. In some embodiments, a service 104 can also be in a failed, available, or unmanaged state.

Figure 8:
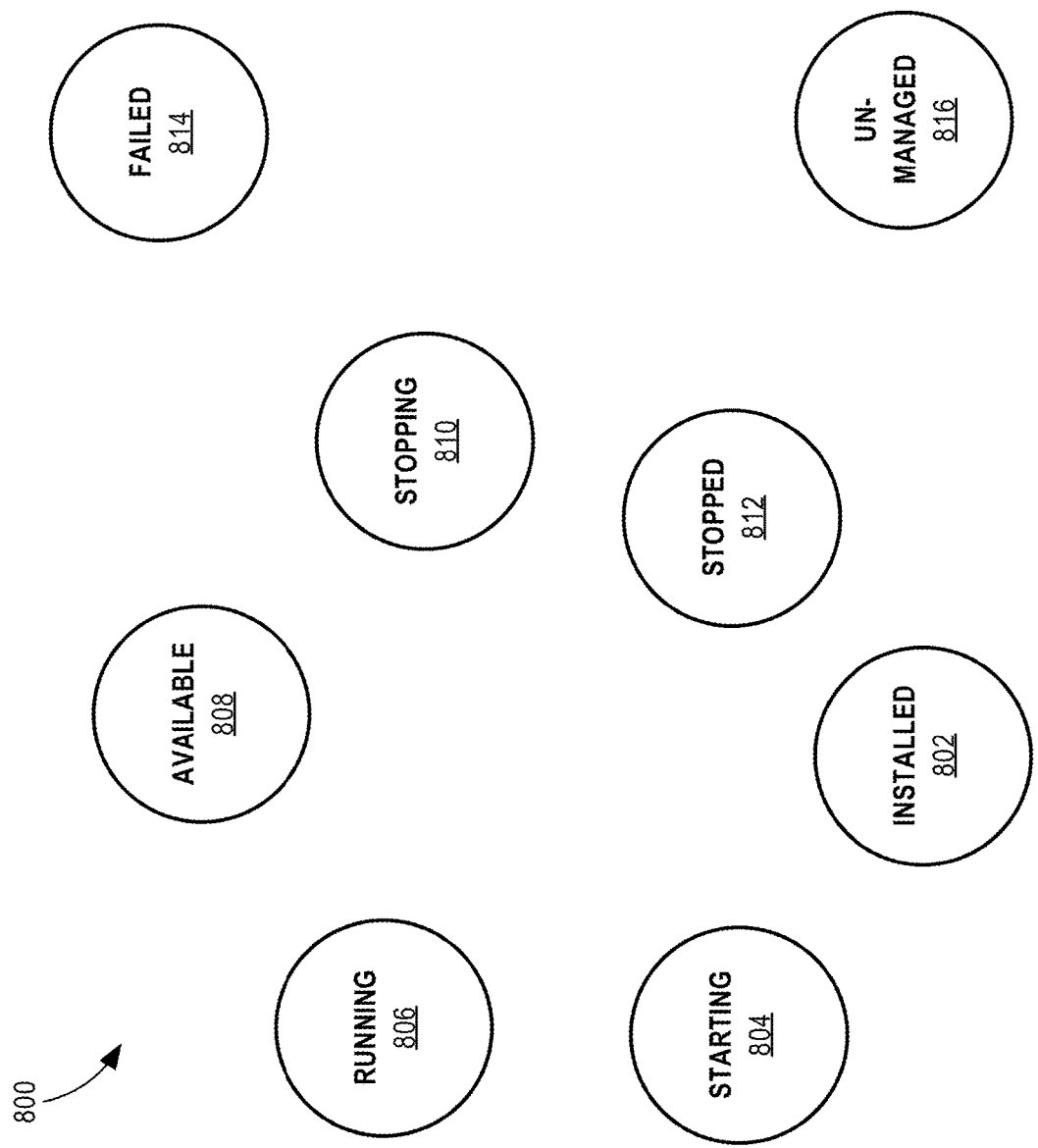
FIG. 8 illustrates a typical lifecycle of a service, according to some embodiments of the present invention.

FIG. 8 illustrates a possible lifecycle 800 of a service 104 2, according to some embodiments of the present invention. Initially, the service 104 is in the installed state 802. When a command is given to start the service 104, the service 104 transitions to the starting 804 state. Once the service 104 has started it is in the running state 806. In the running state 806, the service 104 can transition to the available 808 state when it is ready to take requests or otherwise fully operational or fully functional. The service 104 may transition back and forth between the running 806 and available 808 states depending on current service 104 configuration.

When a command is given to stop the service 104, the service 104 can transition from any of the starting 804, running 806, or available 808 states to the stopping state 810. Once stopped, the service 104 is in the stopped state 812.

In the event of a service 104 failure (e.g., crash, core dump, or other unexpected termination), the service 104 may transition to the failed state 814. An attempt to restart the service after a failure may bring the service 104 back to the starting state 804.

A service 104 may also be unmanaged state 816 if the service 104 is currently not under service lifecycle management.

A service 104 may also have an unknown state 818 of the state of the service 104 is currently unknown.

FIG. 8 illustrates just one example of a possible lifecycle of a service 104. Other lifecycles may more or fewer states.

Target Service State

According to some embodiments, a service 104 has a target state stored in the replicated configuration system 106. The target state represents the desired state for the service 104. The target state for a service 104 can be stored in one of the replicas 206 of the replicated configuration system 106 and then replicated to the other(s) of the replicas 206 in accordance with the consensus protocol.

According to some embodiments, the target state for a service 104 can be RUNNING, STOPPED, or UNMANAGED. The target state for a service 104 may be stored in the replicated configuration system 106 as the value of a predefined key composed of a name for the service 104. For example, if the name for the service 104 is "gemini" then a possible key for storing the target state for the service 104 might be '/lifecycle/gemini/state/target'. The value of that key can be 'RUNNING', 'STOPPED', or 'UNMANAGED' and set based on the desired state for the "gemini" service 104. Other predefined key names based on the name of a service 104 for storing the target state of the service 104 are possible and the key name is not limited to the format of this example.

According to some embodiments, the service lifecycle module 114 at a host 102 watches for changes to the values of the predefined target state keys for services 104 installed at the host 102. For example, if the "gemini" service 104 is installed at host 102(3), then the service lifecycle module 114(3) might watch for changes to the value of the key '/lifecycle/gemini/state/target' in replica 206(3). The watch can be a forward watch or a historical and forward watch. The watch can also be a recursive or non-recursive watch.

According to some embodiments, the service lifecycle module 114 at a host 102 determines the services 104 to watch the target state key of according to a service discovery process. In particular, a predefined key may exist in the replicated configuration system 106 for each host 102. Under that key for a given host, the names of the service(s) 104 installed on the host are stored. Thus, the service lifecycle module 114 at a host 102 can determine the services 104 to watch by enumerating the names of the services 104 under this host-specific key. This host-specific key may have a key name based on a known identifier of the host. For example, if the host identifier of host 102(1) is "host-1," then the key name may be '/hosts/host-1'. If three services "gemini", "alpha", and "bravo" are installed on "host-1," then the following three keys may be stored in the replicated configuration system 106:

'/hosts/host-1/gemini'
'/hosts/host-1/alpha'
'/hosts/host-1/bravo'

In this case, the service lifecycle module 114(1) at host 102(1) can determine the services 104 to watch by enumerating the child keys of the key '/hosts/host-1'. By doing so, the service lifecycle module 114(1) determines that services 104 "gemini", "alpha," and "bravo" are to be watched at host 102(1). The service lifecycle module 114(1) may then set watches on all of the following keys based on the enumerating:

'/lifecycle/gemini/state/target'
'/lifecycle/alpha/state/target'
'/lifecycle/bravo/state/target'

The above example is just one possible approach for the service lifecycle module 114 at a host 102 to (1) determine the names of the services 104 to watch for changes to the target state in the replicated configuration system 106, and to (2) set a watch or watches on the appropriate key or keys in the replicated configuration system 106 to detect when any of those target states change in the replicated configuration system 106. Other approaches include approaches that use different key names and different number of watches can be used.

Current Service State

According to some embodiments, a service 104 at a host 102 has a current service state stored in the replicated configuration system 106. The current service state represents the most recently detected state for the service 104 at the host 102. The current service state for a service 104 at a host 102 can be stored in one of the replicas 206 of the replicated configuration system 106 and then replicated to the other(s) of the replicas 206 in accordance with the consensus protocol.

According to some embodiments, the current service state for a service 104 at a host 102 can be any of STOPPED, STARTING, RUNNING, AVAILABLE, FAILED, STOPPING, STOPPED, or UNMANAGED. The current service state for a service 104 at a host 102 may be stored in the distributed configuration as the value of a predefined key composed of a name for the service 104 and an identifier of the host 102. For example, if the name for the service 104 is "gemini" then a possible key for storing the current state for the service 104 on a host 102 with an identifier of "host-1" might be '/services/gemini/host-1/state/current'. Other predefined key names based on the name of a service 104 and an identifier of a host 102 for storing the current state of the service 104 at a host 102 are possible and the key name is not limited to the format of this example.

According to some embodiments, the service lifecycle module 114 at a host 102 periodically executes a service health check program to determine the current state of a service 104 that it is watching at the host 102. The service lifecycle module 114 then updates the current state key for the service 104 at the host 102 in the replicated configuration system 106 based on results of executing the service health check program.

A service health check program that is executed may be service 104 specific. For example, if the service 104 is APACHE CASSANDRA, then the service health check program may be 'nodetool status'. Other services 104 may use different service health check programs.

Based on the results of executing the service health check program (e.g., a process exit value or other information returned by the service health check program to the service lifecycle module 114), the service lifecycle module 114 may set the value of the current service state key for the service 104 at the host 102 in the replicated configuration system 106 to one of STOPPED, STARTING, RUNNING, AVAILABLE, FAILED, STOPPING, or STOPPED.

It should be noted that not all of these states may be detectable by a particular service health check program for a given service 104. Thus, there is no requirement that the service health check program for a service 104 be able to determine whether the service 104 is in all of these states. For example, a particular service heath check program may only be able to determine whether a service 104 is AVAILABLE or not. For example, the service health check program may output or exit with a Boolean value of TRUE or 1 that indicates that a service 104 at a host 102 is AVAILABLE. On the other hand, a value of FALSE or 0 may indicate that the service 104 at the host 102 is not AVAILABLE.

According to some embodiments, a service 104 at host 102 offers a health check application programming interface (API) to the service lifecycle module 114 at the host 102. When invoked (or signaled via a callback), the health check API provides a Boolean value to the service lifecycle module 114 at the host 102 that indicates whether the service 104 at the host 102 is in the RUNNING state or not. For example, a value of TRUE or 1 may indicate that the service 104 at the host 102 is in the RUNNING state and a different value may indicate that the server 104 at the host 102 is not in the RUNNING state.

The service lifecycle module 114 at a host 102 may determine the current service state of a service 104 at the host 102 based on Boolean values provided by a service health check program for the service 104 at the host 102 and the health check API of the service 104 at the host 102. For example, if the Boolean value provided by the service health check program indicates that the service 104 at the host 102 is AVAILABLE, then the service lifecycle module 114 at the host 102 may determine a current service state of AVAILABLE for the service 104 the host 102. If the Boolean value provided by the service health check program indicates that the service 104 at the host 102 is not AVAILABLE but the Boolean value provided by the health check API of the service 104 at the host 102 indicates that the service 104 at the host 102 is RUNNING, then the service lifecycle module 114 at the host 102 may determine a current service state of RUNNING for the service 104 at the host 102. Otherwise, the service lifecycle module 114 at the host 102 may determine a current service state of UNKNOWN for the service 104 at the host 102.

According to some embodiments, when setting the value of the current service state key for a service 104 at a host 102 in the replicated configuration system 106, the current state key is created with a time to live (TTL) value such that the current service state key for the service 104 at the host 102 is automatically deleted from the replicated configuration system 106 if the value of the current state key is not updated within the TTL period. Setting a TTL on the current service state key protects against failure of the service lifecycle module 114 and failure of the service health check program at the host 102. According to some embodiments, if the current service state key for a given service 104 at a host 102 does not exist in the replicated configuration system 106, then the service 104 is assumed to be in the FAILED state at the host 102.

Process for Service Lifecycle Management

Figure 9:
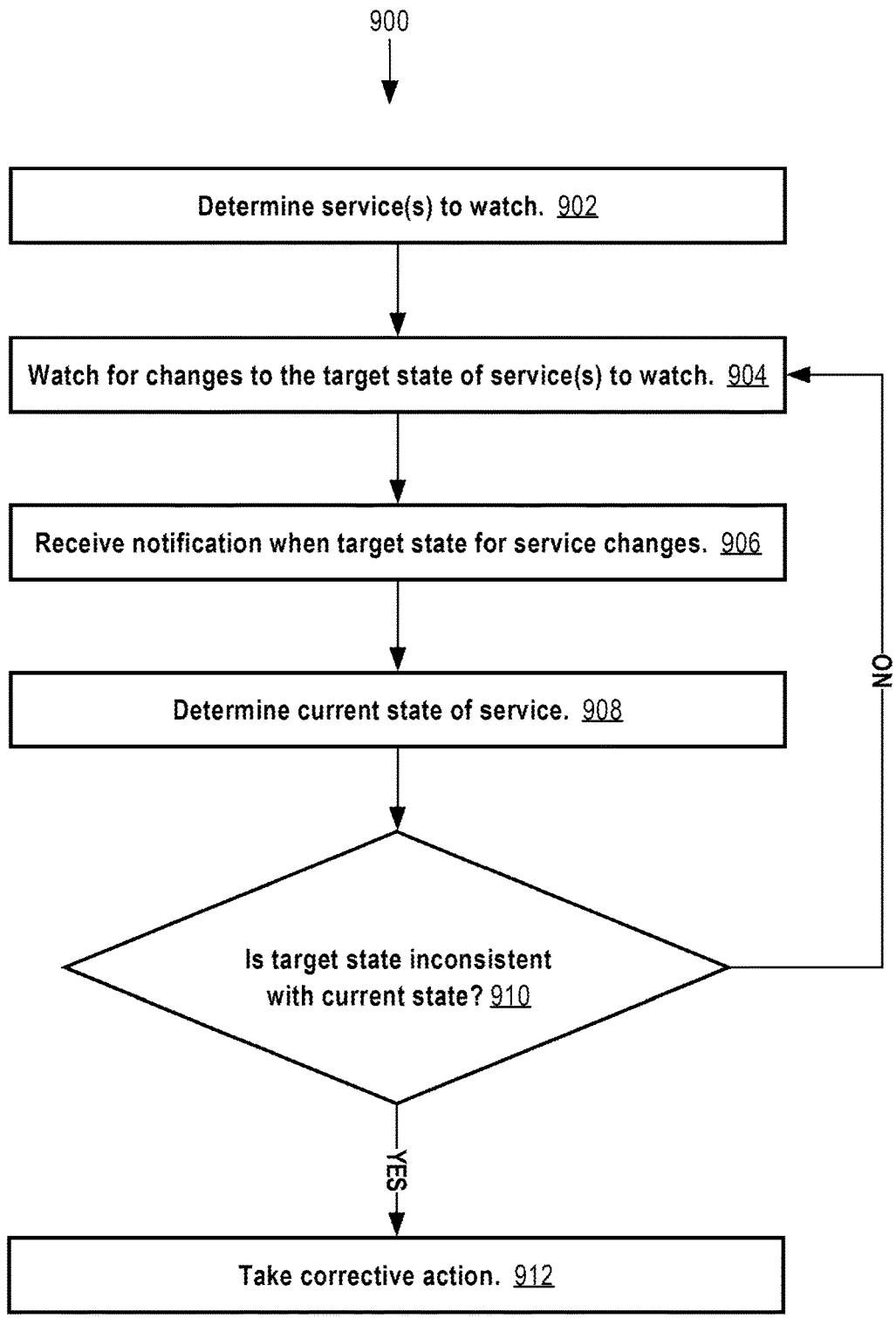
FIG. 9 is a flowchart of a process for service lifecycle management, according to some embodiments of the present invention.

Turning now to FIG. 9, it is a flowchart 900 of a process for service lifecycle management, according to some embodiments of the present invention. The process is described below as being performed by a service lifecycle module 114 executing on a host 102 in accordance with some embodiments. However, in other example embodiments, the process 900 is performed by the replicated configuration system 106 at the host 102 and/or a broker module at the host 102, in addition to or instead of the service lifecycle module 114 on the host 102.

At step 902, the service lifecycle module 114 at a host 102 determines one or more services 104 to watch. This determination may be made by reading service-host binding information from the replicated configuration system 106 at the host 102. The determination may be based on an identifier of the host 102 at which the service lifecycle module 114 is running. For example, the service lifecycle module 114 may determine the one or more services 104 to watch by enumerating the child keys of a predefined key that has the host identifier in the key name. For example, the service lifecycle module 114 may determine the one or more services 104 to watch by enumerating the child key of the key '/hosts/host-1', where 'host-1' is the host identifier of the host 102.

At step 904, the service lifecycle module 114 at the host 102 watches for any changes to the target state of the one or more services 104 to watch. To do this, the service lifecycle module 114 may set a watch on one or more keys in the replicated configuration system 106. The watch can be a forward watch or a historical and forward watch. The watch can be a non-recursive watch. For example, the service lifecycle module 114 may set a watch on each of the following keys:

'/lifecycle/gemini/state/target'
'/lifecycle/alpha/state/target'
'/lifecycle/bravo/state/target'

At step 906, the service lifecycle module 114 at the host 102 is notified by the replicated configuration system 106 module at the host 102 when the target state of one of the services 104 it is watching at the host 102 changes in the replicated configuration system 106. For example, the service lifecycle module 114 at the host 102 "host-2" may be notified when the value of the key '/lifecycle/gemini/state/target' changes 'RUNNING', 'STOPPED', or 'UNKNOWN'.

At step 908, the service lifecycle module 114 at the host 102 determines the current service state of the service 104 at the host 102. For example, the service lifecycle module 114 may read the value of the key '/services/gemini/host-1/state/current' to determine the current state of the service 104 "gemini" at host 102 "host-1."

At step 910, the service lifecycle module 114 at the host 102 determines if the current state of the service 104 at the host 102 determined at step 908 is inconsistent with the new target state for the service 104 detected at step 906. According to some embodiments, the current state is inconsistent with the target state if the target state is 'RUNNING' and the current service state key is missing or the value of the current state key is 'STOPPED', 'FAILED', 'STOPPING', 'STOPPED', 'UNKNOWN', or 'UNMANAGED'.

According to some embodiments, the current server state is inconsistent with the target state if the target state is 'STOPPED' and the current state key is missing or the value of the current state key is 'STARTING', 'RUNNING', 'AVAILABLE', 'FAILED', 'UNKNOWN', or 'UNMANAGED'. According to some embodiments, if the target state is 'UNMANAGED', then the current service state is considered to be consistent with the target state. In this case, the process 900 may skip step 912 and return to step 904 to wait for further changes to the target service state for a service 104.

At step 912, if the current state and the target state are inconsistent, then the service lifecycle module 114 at the host 102 takes corrective action. The corrective action taken may depend on the target state. For example, if the target service state is 'RUNNING', then the service lifecycle module 114 at the host 102 may attempt to start the service 104 at the host 102. On the other hand, if the target service state is 'STOPPED', then the service lifecycle module 102 at the host 102 may attempt to stop the service 104 at the host 102.

If, at step 910, the target service state and the current service state are not inconsistent, then the process may return to step 904 to continue to watch for changes to the target states of the one or more services 104 to watch.

Log Management

A distributed computing environment may have many different services 104 running on the hosts 102 Each of those services 104 may generate their own log files at the hosts 102 during operation. The log files may store information generated by the services 104 such as log messages, performance metrics, stack traces, user information, transaction information, error messages, or other information that reflects the activity of or user interaction with the services 104 during operation.

It is often desirable to collect and aggregate the log files, or information in the log files, from all the hosts 102 where they can be persisted and analyzed. Typically, there is a centralized network service in the distributed computing environment where the log information is collected and aggregated. For example, the centralized network service may be an instance of the APACHE KAFKA publish-subscribe messaging system. In this case, a log forwarding module at each of the hosts 102 may collect log information generated at a host 102 on which it is running and then send log information to the centralized network service. This may be a continuous process thereby resulting in a "stream" of log information that flows over the network from each of the hosts 102 to the centralized network service.

One challenge is configuring the log forwarding module at each of the hosts 102 with network endpoint information for the centralized log collection and aggregation network service so that the log forwarding module can send the stream of log information to the network service. The network endpoint information may include a network address and a network port of the network service, for example.

One possible solution to this is to hard-code the network endpoint information for the centralized log collection and aggregation network service into the log forwarding module. However, this would require updating the log forwarding module with new software at each of the hosts 102 whenever the network endpoint information for the centralized network service changes.

Another possible solution is store the network endpoint information for the centralized network service in a configuration file of the log forward module at each of the hosts 102. However, this would require updating the configuration files at each of the hosts 102 whenever the network endpoint information for the centralized network service changes.

A more flexible and more automated approach to log management is needed.

Log Forwarding Process

Figure 10:
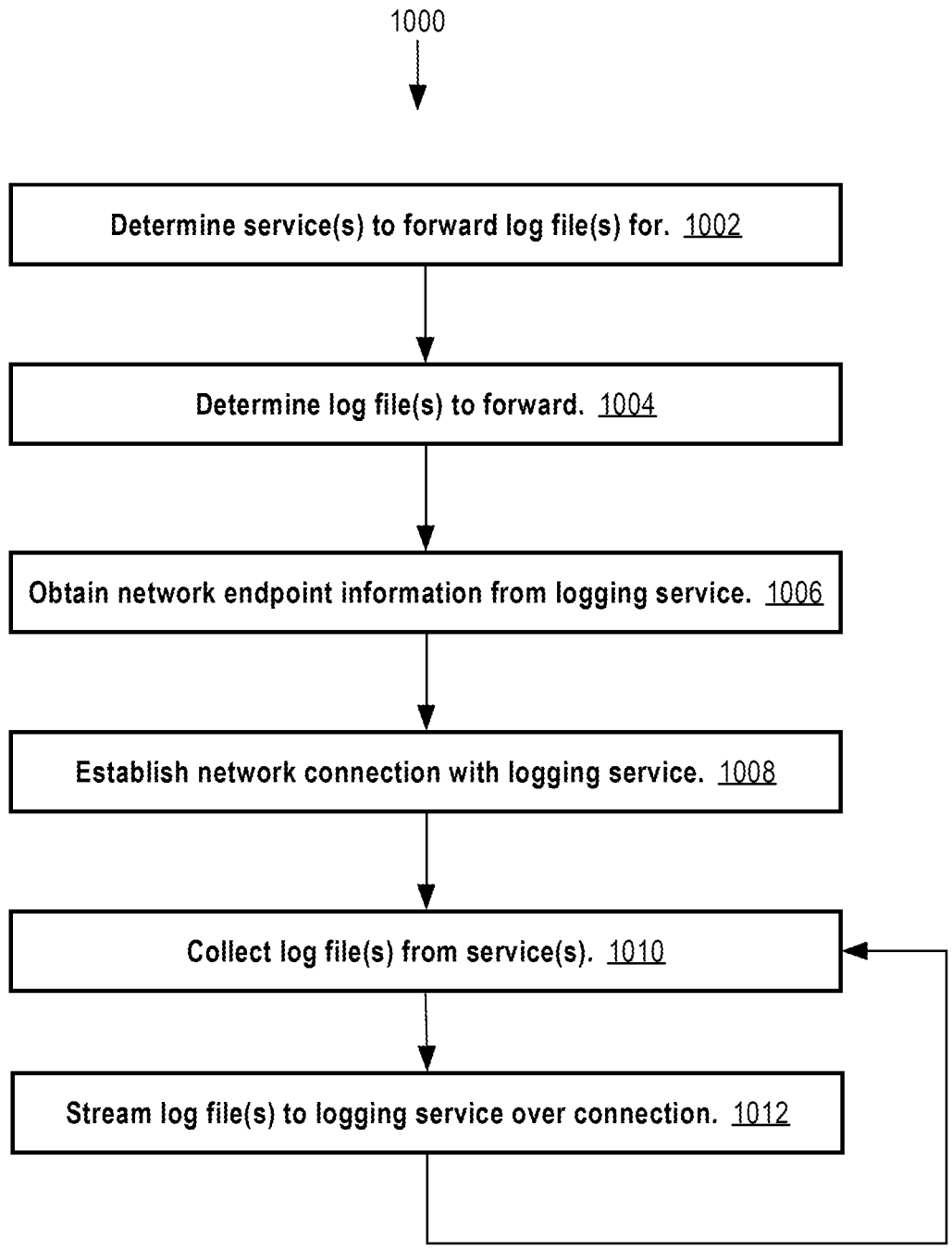
FIG. 10 is a flowchart of a process for log management, according to some embodiments of the present invention.

Turning now to FIG. 10, it is a flowchart 1000 of a process for log management, according to some embodiments of the present invention. The process is described below as being performed by a log management module 112 executing on a host 102 in accordance with some embodiments. However, in other example embodiments, the process 1000 is performed by the replicated configuration system 106 at the host 102 and/or a broker module at the host 102, in addition to or instead of the log management module 112 on the host 102.

At step 1002, the log management module 112 at a host 102 determines one or more services 104 at the host 102 to forward log files for. This determination may be made by reading service-host binding information from the replicated configuration system 106 at the host 102. The determination may be based on an identifier of the host 102 at which the log management module 112 is running. For example, the log management module 112 may determine the one or more services 104 to forward log files for by enumerating the child keys of a predefined key that has the host identifier in the key name. For example, the log management module 112 may determine the one or more services 104 to forward log files for by enumerating the child keys of the key '/hosts/host-1', where 'host-1' is the host identifier of the host 102. Each such child key may identify the name of a service 104 installed at the host 102.

At step 1004, the log management module 112 at the host 102 determines the log file(s) to forward. In particular, for each of the services 104 determined at step 1002, the log management module 112 determines file system path(s) to the log file(s) of the service 104 to forward. This determination may be made by reading service-host binding information or service information from the replicated configuration system 106 at the host 102. The determination may be based on an identifier of the service 104 and/or an identifier of the host 102 on which the service 104 is running. If the file system path(s) to the log file(s) of a service 104 are the same at each host 102 on which the service 104 is installed, then the determination of the file system path(s) from the replicated configuration system 106 may require an identifier of the service 104 but not an identifier of a particular host 102 on which the service 104 is installed. For example, the log management module 112 may determine the one or more file system paths of one or more log files to forward by enumerating the child keys of a predefined key that has the service identifier in the key name. For example, the log management module 112 may determine one or file system paths of one or more log files to forward by enumerating the child keys of the key '/services/gemini/logs', where 'gemini' is the identifier of the service 102. Each such child key may identify a fully-qualified or relative file system path of a log file of the service 102.

At step 1006, the log management module 112 at the host 102 reads the value of a predefined key that comprises network endpoint information for a centralized log collection and aggregation network service. The predefined key may or may not be host specific depending in whether there are multiple centralized log collection and aggregation network services that serve different hosts 102. For example, the predefined key can be '/logging/endpoint' if there is just one centralized log collection and aggregation network service in the distributed computing environment. Alternatively, the predefined key can be '/logging/endpoint/host-1' if there are multiple centralized log collection and aggregation network services that serve different hosts 102. The predefined key may also be stack specific (e.g., 'prod') and/or a service group specific (e.g., 'auth'), if there is a centralized log collection and aggregation network service that services a particular stack and/or particular service group.

At step 1008, the log management module 112 at the host 102 uses the network endpoint information to establish a network connection with a centralized log collection and aggregation network service. For example, the network endpoint information may comprises a network address and a network port with which the log management module 112 can establish a Transmission Control Protocol (TCP) connection with the centralized log collection and aggregation network service.

At step 1010, the log management module 112 at the host 102 collects the log file(s) of the service(s) 104 at the host 102, identified at steps 1002 and 1004. For example, log management module 112 may read from the log file(s) stored at specified locations in a file system of the host 102.

At step 1012, the log management module 112 at the host 102 sends the collected log files as part of a stream to the centralized log collection and aggregation network service over the network connection established at step 1006. According to some embodiments, log files are tagged in the stream with the names of the services 104 from which the log files were collected at step 1008. In this way, log files in the stream are associated with the services 104 from which they were collected.

Steps 1010 and 1012 may repeat continuously as the services 104 at the host 102 generate new log files, rotate log files, or add new information to existing log files.

Role-Based Configuration Discovery

A system and method for role-based configuration discovery is also provided. In some embodiments, configuration information for services 104 is discoverable in the replicated configuration system 106 based on the roles the services 104 have. Configuration information for a service 104 is stored in the replicated configuration system 106 as a service definition. The service definition comprises one or more key-value pairs. One of the keys may be a "roles" key. The value of the roles key specifies one or more roles the service 104 has. For each role of the service 104 has, the service definition may include one or more "role-specific" keys. A role-specific key is specific to a particular role that a service 104 has. If a service 104 has a particular role, then the service definition for the service 104 is expected to also include all of the role-specific keys required by the particular role. In some embodiments, the system and method use a configuration broker module and the replicated configuration system 106 on the host 102 to enumerate configuration information for all services 104 installed on the host 104 that have a specified role.

Role-Based Configuration Discovery Model

Figure 11:
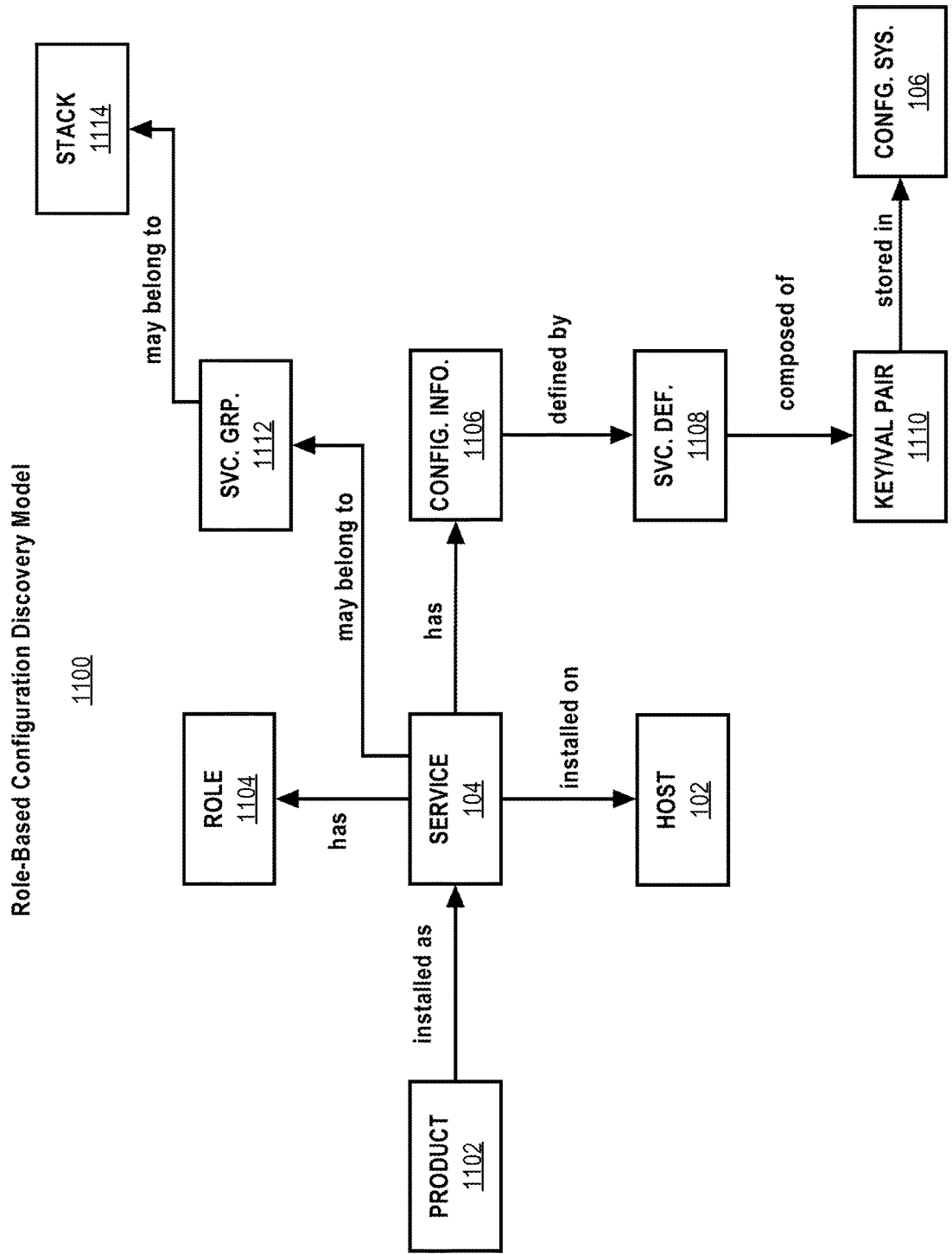
FIG. 11 is a block diagram of a role-based configuration discovery model, according to some embodiments of the present invention.

FIG. 11 is a block diagram of a role-based configuration discovery model 1100, according to some embodiments of the present invention. The model 1100 is centered on a service 104. A service 104 is a product 1102 that is installed on one or more hosts 102. A product 1102 in turn encompasses software or other set or sets of computer-executable instructions and associated configuration and metadata that can be installed on one or more hosts 102.

A service 104 can have one or more roles 1104. A role 1104 represents a capability of a service 104 when executing. A service 104 also has configuration information 1106 that the service 104 uses to set execution parameters of the service 104. The configuration information 1106 for a service 104 is defined by a service definition 1108 which is composed of one or more key-value pairs 1110.

The key-value pairs 1110 of a service definition 1108 are stored in the replicated configuration system 106. The key-value pairs 1110 of a service definition 1108 may include a roles key-value pair and one or more role-specific key-value pairs. The roles key-value pair specifies the one or more roles 1104 that the service 104 has. Each role-specific key-value pair specifies configuration information 1106 for the service 106 that is specific to one of the roles 1104 of the service 104. A service 104 may also belong to one or more service groups 1112. A service group 112 in turn may belong to one or more stacks 114.

As discussed above, a service 104 is an instance of a product 1102 that is installed on at least one host 102. For example, a service 104 might be a web server, a database server, or other product 1102 installed on a single host 102 or installed on multiple hosts 102 in a clustered, failover, load balanced, or other distributed computing arrangement. A product 1102 is an installable software product, program, or other set or sets of installable computer-executable instructions and associated configuration and metadata. For example, a product 1102 may be installed on one or more hosts 102 by a package manager or other program or collection of software tools that automates or facilitates the process of installing, upgrading, configuring, or removing computer programs for a host's 102 operating system in a consistent and reliable manner.

As discussed, a host 102 can be a single computing device such as, for example, computing device 1400 described below with respect to FIG. 14. Alternatively, a host 102 can be a single virtual computer instance that executes on a computing device (e.g., device 1400) facilitated by a virtualization layer interposed between the virtual computer instance and the computing device. The virtualization layer can be a virtual machine monitor such as, for example, virtual machine monitor 1530 described below with respect to FIG. 15. Regardless if a single computing device or a single virtual computer instance, a host 102 can be configured with an operating system such as, for example, operating system 1510 described below with respect to FIG. 15. The operating system of a host 102 can manage low-level aspects of the host's 102 operation including managing execution of processes, memory allocation, file input and output (I/O), and device I/O. A host 102 may also be configured with a container platform (e.g., DOCKER) for running services 104 within containers on the host's 102 operating system.

As mentioned, a role 1104 represents a capability of a service 104 when executing. The capability can be a function or operation performed by the service 104 when executing or a result produced by the service 104 when executing. For example, a role 1104 of a service 104 may be a log producer. That is, when the service 104 executes at host 102, the service 104 produces or generates one or more log files at the host 102. As another example, a role 1104 of a service 104 may be a server. In this case, the service 104 when executed has the capability of responding to network requests from network clients.

A service 104 has configuration information 1106 that the service 104 uses to set execution parameters of the service 104. The execution parameters may be service specific. That is, specific to the type of the service 104 or specific to the product 1102 that the service 104 is an installation of. The configuration information 1106 of a service 104 may be defined by a service definition 1108 that is stored as a set of key-values pairs 1110 in the replicated configuration system 106.

The set of key-values pairs 1110 may be hierarchical or nested. That is, the value of one key-value pair in the set of key-values pairs 1110 may be one or more keys of one or more other key-value pairs in the set of key-values pairs 1110. Each key-value pair in the set of key-values pairs 1110 has a key name. The key name may be represented by character string data and may represent a path in a hierarchical key namespace.

One of the key-value pairs 1110 for a service 104 may be a "roles" key-value pair. The value of the roles key-value pairs specifies one or more roles 1104 of the service 104. For example, for a service 104 named "gemini", in the "auth" service group 1112, which is in the "prod" stack 1114, the roles key-value pair for this service 104 might be:

'{'/services/prod/auth/gemini/roles': ['log-producer']}'

In this example, the roles key-value pair specifies that the "gemini" service 104 belonging to the "auth" service group 1112 in the "prod" stack 1114 has a role 1104 of 'log-producer'. If the service 104 had other roles 1104 in addition to 'log-producer', then identities of those roles 1104 would be specified in the value of the roles key-value pair. In this example, the character string 'log-producer' identifies a particular role 1104 that the service 104 has.

In some embodiments, instead of a service definition 1108 having a single roles key-value pair with a value that specifies a list or an array of one or more identifiers of a role 1104, the service definition 1108 has one or more role key-value pairs. The key name of each role-key-value pair specifies an identifier of a role 1104. For example, instead of the service definition 1108 for the "gemini" service 104 having the a roles key-value pair of '{'/services/prod/auth/gemini/roles':['log-producer', 'web-server']}', the service definition 1108 might instead have the following role key-value pairs:

'{'/services/prod/auth/gemini/role/log-producer'}'
'{'/services/prod/auth/gemini/role/web-server'}'

It should also be understood that if a service 104 does not belong to a service group 1112 or a stack 1114, the name of a service group 1112 and the name of a stack 1114 may be omitted from the name of the roles key-value pair or the name(s) of the role key-value pair(s). For example, the service definition 1108 for the "gemini" service 104 might have the following roles key-value pair:

'{'/services/gemini/role/log-producer'}'
'{'/services/gemini/role/web-server'}'

Or the following role-key-value pairs:

'{'/services/gemini/role/log-producer'}'
'{'/services/gemini/role/web-server'}'

It should also be understood that the key names 'services', 'roles', and 'role' in the above-example key-value pairs and the identifiers of the roles 1104 are examples only, selected for purposes of illustration. The key names and role identifiers could be differently named according to the requirements of the particular implementation at hand.

When a service 104 has a particular role 1104 as specified by the value of the roles key-value pair or a role key-value pair for the service 104, then the service 104 may be expected by convention to include, as part of its service definition 1108, all of the role-specific key-value pairs that are required by the particular role 1104. For example, the "log-producer" role 1104 may require that values for the following role-specific keys be defined in a service definition 1108 of a service 104 named "gemini" that has the "log-producer" role 1104:

'[base key]/log-producer/source'
'[base key]/log-producer/reg-ex'
'[base key]/log-producer/date-time-format'

In the above example, the "[base key]" may be, for example '/services/gemini' or '/services/prod/auth/gemini' depending on whether the service definition 1108 for the "gemini" service 104 is or is not specific to the "auth" service group 1112 and the "prod" stack 1114. Also in the above example, the "log-producer" role 1104 requires that values for a 'source' key, a 'reg-ex' key, and a 'date-time-format' key be defined in the service definition 1108 for the "gemini" service 104. The value of the 'source' key may specify a filesystem path to the location of a log file such as, for example, '/var/logs/gemini/log'. The value of the 'reg-ex' key may specific a regular expression pattern for matching against log lines in the log file for purposes of extracting relevant information from the log lines. The value of the 'date-time-format' key may specify the format of date/time stamps in the log lines in the log file. The value of the 'date-time-format' key may be used, for example, to convert, using a standard library function, a character string representation of a date/time in a log line to an in-memory object that represents the date/time according to locale settings.

The above is just one example of possible role-specific keys for the "log-producer" role 1104. In other embodiments, the "log-producer" role 1104 or other roles 1104 have other or different role-specific keys, or role-specific keys with different key names. As an alternative to the above example scheme, role specific values may be contained in the value of a single key value pair. For example, the "log-producer" role 1104 may have the following format:

'[base key]/log-producer={
  'source': 'some-source',
  'reg-ex': '^(?type).*',
  'date-time-format': 'YYYY-MM-DD'
}'

By using a roles key-value pair or a role key-value pair in a service definition 1108, configuration information 1106 for a service 104 is discoverable in the replicated configuration system 106 by the name or identifier of a role 1104 that the service 104 has. By using role-specific keys in a service definition 1108, configuration information 1106 for a service 104 that pertains to a particular role 1104 the service 104 has is discoverable in the replicated configuration system 106.

Role-Based Configuration Discovery System

Figure 12:
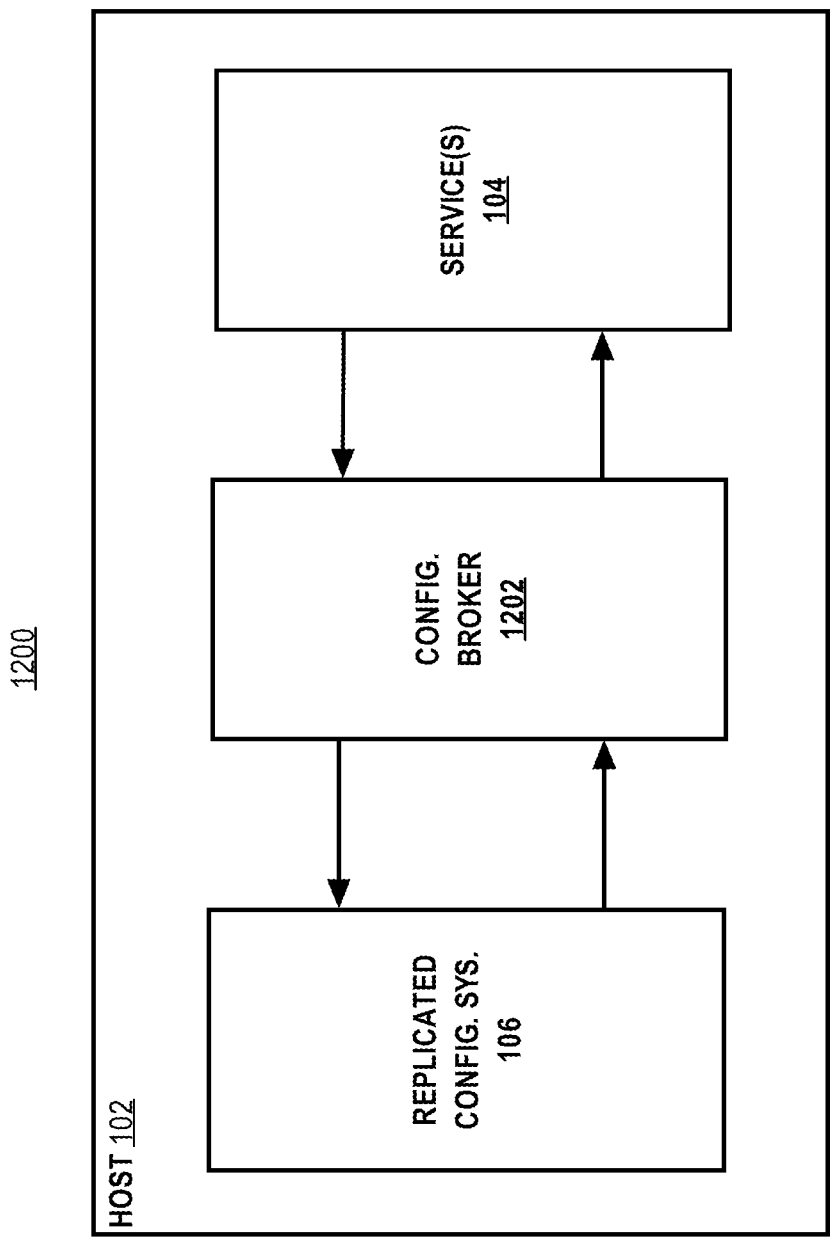
FIG. 12 is a block diagram of a system for role-based configuration discovery, according to some embodiments of the present invention.
Figure 13:
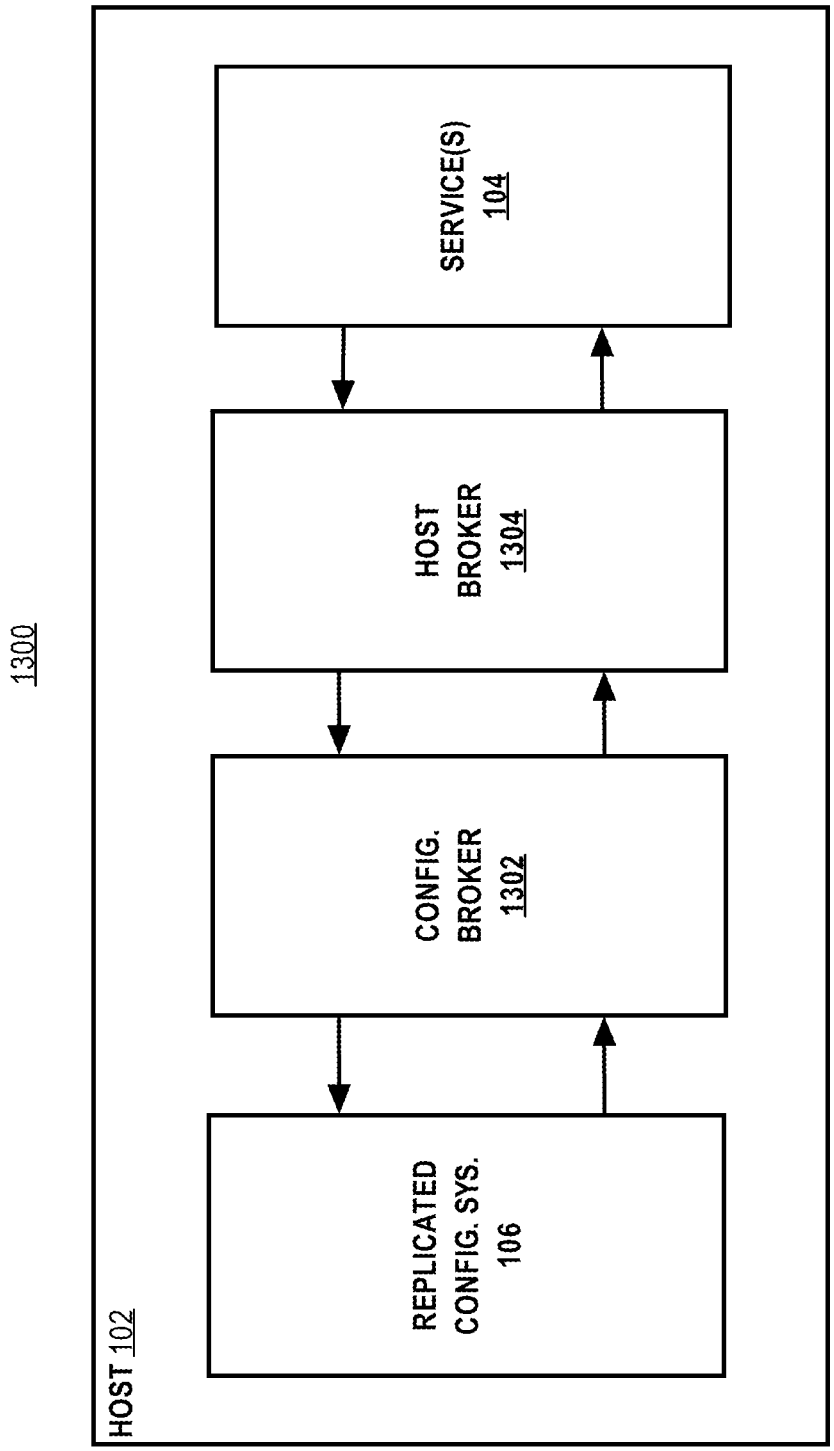
FIG. 13 is a block diagram of a second system for role-based configuration discovery, according to some embodiments of the present invention.

FIG. 12 is a block diagram of a role-based configuration discovery system 1200, according to some embodiments of the present invention. The system 1200 provides role-based configuration discovery to services 104 executing on hosts 102. FIG. 12 provides a logical view of a system 1200, which in some embodiments may be implemented on physical computing device such as, for example, device 1400 described below. The system 1200 includes a replicated configuration system 106, a configuration broker module (or one or more sets of instructions) 1202, and one or more services 104 at a host 102. A similar configuration may exist at the others of the hosts 102 that are also configured with the replicated configuration system 106.

A service 104 at the host 102 is configured to determine all of the other services 104 installed on the host 102 that have a particular role 1104. For example, a "log aggregator" service 104 at the host 102 may be configured to determine all of the other services 104 installed on the host 102 that have the "log-producer" role 1104. A service 104 at the host 102 is configured to determine all of the other services 104 installed on the host 102 that have a particular role 1104 by sending an "enumerate" request to the configuration broker 1202. For example, the "log aggregator" service 104 may determine the services 104 at the host 102 with the "log-producer" role 1104 by sending a "enumerate" request to the configuration broker 1102.

To receive an "enumerate" request, the configuration broker 1102 provides a RESTful interface to services 104 installed on the host 102. For added security, the RESTful interface may be offered only on a local host network interface of the host 102. REST stands for representational state transfer and is a software architecture consisting of guidelines and best practices for creating scalable web services. RESTful computer systems typically communicate over HTTP or HTTPS using HTTP request methods such as GET, POST, PUT, etc. Further description of REST is available in the paper by Roy T. Fielding and Richard N. Taylor, "Principled Design of the Modern Web Architecture," ACM Transactions on Internet Technology, Vol. 2, No. 2, May 2002, pp. 115-150, the entire contents of which are hereby incorporated by reference.

At a minimum, the enumerate request specifies an identifier or name of a role 1104. For example, the enumerate request from the "log aggregator" service 104 may specify an identifier or name of the "log-producer" role 1104. The enumerate request may include other information that qualifies the request. For example, the enumerate request may also specify an identifier or name of a service group 1112 or a stack 114. If the enumerate request specifies only a role 1104 without a service group 1112 or stack 1114 qualification, then the enumerate request is treated as a request for configuration information 1106 for all services 104 installed at the host 102 that have the specified role 1104. If, instead, the enumerate request additionally specifies a service group 1112 and a stack 1114, then the request is treated as a request for configuration information 1106 for all services 104 installed at the host 102 that (a) have the specified role 1104, and (b) belong to the specified service group 1112 and the specified stack 114.

It should be noted that the enumerate request need not specify a name or other identifier of the host 102 on which the service 104 is installed. Because of this, the service 104 need not be specially configured or programmed to determine that host 102 on which it is installed in order to formulate and send the enumerate request to the configuration broker 1202, thereby simplifying the configuration and programming task for the administrator or developer of the service 104.

The configuration broker 1202 is configured to determine the services 104 installed on the host 102 instead of configuring each service 104 installed on the host 102 to determine the host 102 on which it is installed. As there typically will be only one configuration broker 1202 at a host 102 serving multiple services 104 installed on the host 102, this arrangement centralizes service-host binding discovery at the configuration broker 102 at the host 102, as opposed to distributing the discovery across all of the services 104 installed at the host 102, thereby simplifying the administration, configuration, and programming of the services 104.

The configuration broker 1202 determines the services 104 installed at a host 102 from service-host binding information for the host 102 stored in the replicated configuration system 106. The set of services 104 installed a host 102 is sometimes referred to herein as the "host's services." The configuration broker 102 determines the host's services by enumerated sub-keys of a host-specific key in the replicated configuration system 106. For example, the host-specific key for a particular host 102 named or identified by "host-1" might be '/hosts/host-1'. In this case, the direct sub-keys in the replicated configuration system 106 of the host-specific key may each identify a service 104 installed on the particular host 102, For example, the host-specific key '/hosts/host-1' may have the following direct sub-keys specifying that a "gemini", an "alpha", and a "beta" service 104 are installed on the "host-1" host 102:

'/hosts/hosts-1/gemini'
'/hosts/host-1/alpha'
'/hosts/host-1/beta'

As an alternative, the host-specific key may have a value in the replicated configuration system 106 that lists the services 104 installed in the host 102. For example, instead of using the above key arrangement where each direct sub-key of the host-specific key identifiers a service 104 installed on the "host-1" host 102, the value of the host-specific key '/hosts/host-1' might be the list value:
'['gemini', 'alpha', 'beta']'

Once retrieved from the replicated configuration system 106, the configuration broker 1202 may cache the service-host binding information in a memory or storage accessible to the configuration broker 1202 so that the configuration broker 1202 does not need to retrieve the service-host binding information from the replicated configuration system 106 for each enumerate request. When service-host binding information is retrieved and cached, the configuration broker 1202 may set a watch on the host-specific key so that the configuration broker 1202 at the host 102 is notified when the service-host binding information for the host 102 changes in the replicated configuration system 106. When notified of a change, the configuration broker 1202 may have invalidated the currently cached service-host binding information and retrieved the updated service-host binding information for the host 102 from the replicated configuration system 106. The configuration broker 1202 may then cache the updated service-host binding information until the service-host binding information for the host 102 changes again in the replicated configuration system 106.

When the configuration broker 1202 receives an enumerate request from a service 104, the configuration broker 1202 determines which of the host's services have the role 1104 specified in the enumerate request. And if the enumerate request additionally specifies a service group 1112 and a stack 1114, the configuration broker 1202 determines which of the host's services belong to the specified service group 1112 and the specified stack 114 have the role 1104 specified in the numerate request. To make this determination, the configuration broker 1202 queries the roles key or the set of role keys of each service definition 1108 of each of the host's services stored in the replicated configuration system 106. The query may be for a roles key or a role key that has or matches a value that includes a name or other identifier of a role 1104 specified in the enumerate request. The configuration broker 1202 may cache service definitions 1108 retrieved from the replicated configuration system 106 and watch for changes to the service definitions 1108 for the host's services in the replicated configuration system 106, in addition or instead of caching and watching for changes to service-host binding information in the replicated configuration system 106.

For each service definition 1108 of the host's services that has a roles key or a role key that the configuration broker 1202 identifies as matching or satisfying the role 1104 identified or named in an enumerate request from a service 104, the configuration broker 1202 returns a representation of the service definition 1108 to the service 104. The representation may be in JavaScript Object Notation (JSON), eXtensible Markup Language (XML), or other suitable data format. The representation includes selected key-value pairs 1110 of the service definition 1108. The key-value pairs 1110 selected can be just the role-specific key-value pairs that are specific to the role 1104 specified in the enumerate request. In addition, or alternatively, the key-value pairs 1110 selected from the service definition 1108 can be all of the key-value pairs 1110 of the service definition 1180 or a subset or superset thereof.

Some values of key-value pairs 1110 of a service definition 1108 for a service 108 may have host-specific values. That is, the value may vary or be different depending on the particular host 102 on which the service 104 is installed. In this case, it would be desirable to store the service definition 1108 in the replicated configuration system 106 in a way that is host independent, as opposed to storing separate service definitions 1108 for the service 104, one for each host 102 on which the service 104 is installed. To facilitate a host-independent service definition 1108, values of key-value pairs 1110 of a service definition 1108 stored in the replicated configuration system 106 may include embedded expressions and the configuration broker 1202 may include an expression processor for processing embedded expressions. Before providing a value of a key-value pair 1110 to a service 104 in response to an enumerate request from the service 104, the configuration broker 1202 parses or scans the value for syntax that indicates that the value contains an embedded expression. For example, an embedded expression in a value may be indicated by a tag that contains a tag key. For example, the syntax of a tag might be '{{host}}' where the enclosing double brackets are used to set off the tag key 'host'. One possible type of tag is a variable tag. A variable tag is a tag in which the tag key is the name of a variable defined in memory or storage accessible to the configuration broker 1202. When the configuration broker 1202 identifies a value of a key-value pair 1110 that contains a variable tag, the configuration broker 1202 replaces the tag in the value with the variable definition. For example, assume the configuration broker 1202 has a variable named 'host' defined as 'host-1.some.domain'. Further, assume a service definition 1108 retrieved from the replicated configuration system 106 contains the following key-value pair:

'{'/services/gemini/host': '{{host}}'}'

Assuming the configuration broker 1202 identifies '{{host}}' as a variable tag, then the key-value pair as provided to a service 108 in response to an enumerate request from the service 104 would be:

'{'/services/gemini/host': 'host-1.some.domain'}'

By using variable tags, service definitions 1108 of services 104 can be stored in the replicated configuration system 106 in a host-independent manner yet provided to services 104 in response to enumerate requests in a host-specific manner.

Figure 14:
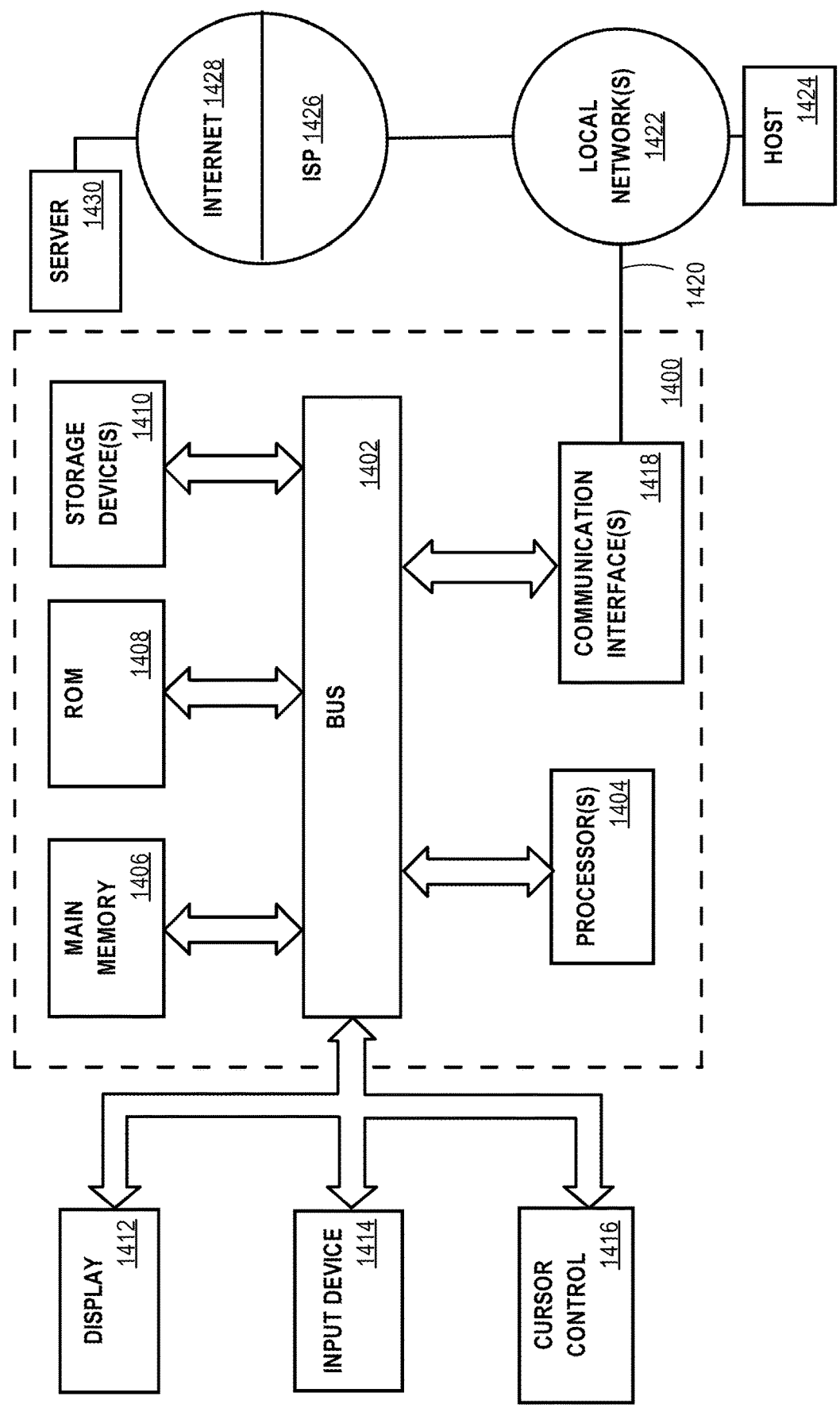
FIG. 14 is a very general block diagram of a computing device in which some embodiments of the present invention may be embodied.

FIG. 14 is a block diagram of an alternative role-based configuration discovery system 1300, according to some embodiments of the present invention. In system 1300, discovery information may be stored separate from configuration information with the key space. In this scheme, the configuration information is what should be and the discovery information is what actual is. System 1300 enables eventual consistency between the configuration information and the discovery information.

According to some embodiments, the host broker 1304 may be responsible for registering a service 104 with the configuration broker 1302. This registering includes setting all key-value pairs associated with the role and the service is currently assigned to. If or when the host assignment of the service changes, the host broker 103 may update the registration information by informing the configuration broker 1302.

According to some embodiments, the configuration broker 1302 stores discovery information according to the following schema expressed in JSON:

```
'/discovery/{role-name}/{service-id}'={
"serviceName": "gemini",
"stackName": "production",
"key-1": "value-1",
"key-2":"value-2",
"hostname": "gdearment-mbpr.local"
}
```

Here, the value of the key "stackName" indicates the stack to which the "gemini" service is assigned and can be used for filtering the discovery information in the distributed configuration store. The value of the key "hostname" indicates the hostname to which to the "gemini" service is assigned, and can also be used for filtering the discovery information in the distributed configuration in addition to or instead of the value of the "stackName" key.

According to some embodiments, discovering which services implement a given role includes performing a lookup for all services under the key '/discovery/{role-name}' where {role-name} is the name of the given role of interest. As indicated above, this set of discovery information may optionally be filtered based on the values of keys of the discovery information. This manner of discovery involves a very efficient lookup of all services that implement the given role and then filtering on a smaller subset.

Basic Computing Device

Referring now to FIG. 14, it is a block diagram that illustrates a basic computing device 1400 in which the example embodiment(s) of the present invention may be embodied. Computing device 1400 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1400 may include a bus 1402 or other communication mechanism for addressing main memory 1406 and for transferring data between and among the various components of device 1400.

Computing device 1400 may also include one or more hardware processors 1404 coupled with bus 1402 for processing information. A hardware processor 1404 may be a general purpose microprocessor, a system on a chip (SoC), or other processor.

Main memory 1406, such as a random access memory (RAM) or other dynamic storage device, also may be coupled to bus 1402 for storing information and software instructions to be executed by processor(s) 1404. Main memory 1406 also may be used for storing temporary variables or other intermediate information during execution of software instructions to be executed by processor(s) 1404.

Software instructions, when stored in storage media accessible to processor(s) 1404, render computing device 1400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1400 also may include read only memory (ROM) 1408 or other static storage device coupled to bus 1402 for storing static information and software instructions for processor(s) 1404.

One or more mass storage devices 1410 may be coupled to bus 1402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1410 (e.g., the main hard disk for the device) stores a body of program and data for directing operation of the computing device, including an operating system, user application programs, driver and other support files, as well as other data files of all sorts.

Computing device 1400 may be coupled via bus 1402 to display 1412, such as a liquid crystal display (LCD) or other electronic visual display, for displaying information to a computer user. In some configurations, a touch sensitive surface incorporating touch detection technology (e.g., resistive, capacitive, etc.) may be overlaid on display 1412 to form a touch sensitive display for communicating touch gesture (e.g., finger or stylus) input to processor(s) 1404.

An input device 1414, including alphanumeric and other keys, may be coupled to bus 1402 for communicating information and command selections to processor 1404. In addition to or instead of alphanumeric and other keys, input device 1414 may include one or more physical buttons or switches such as, for example, a power (on/off) button, a "home" button, volume control buttons, or the like.

Another type of user input device may be a cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

While in some configurations, such as the configuration depicted in FIG. 14, one or more of display 1412, input device 1414, and cursor control 1416 are external components (i.e., peripheral devices) of computing device 1400, some or all of display 1412, input device 1414, and cursor control 1416 are integrated as part of the form factor of computing device 1400 in other configurations.

Functions of the disclosed systems, methods, and modules may be performed by computing device 1400 in response to processor(s) 1404 executing one or more programs of software instructions contained in main memory 1406. Such software instructions may be read into main memory 1406 from another storage medium, such as storage device(s) 1410. Execution of the software instructions contained in main memory 1406 cause processor(s) 1404 to perform the functions of the example embodiment(s).

While functions and operations of the example embodiment(s) may be implemented entirely with software instructions, hard-wired or programmable circuitry of computing device 1400 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more software instructions to processor(s) 1404 for execution. For example, the software instructions may initially be carried on a magnetic disk or solid-state drive of a remote computer. The remote computer can load the software instructions into its dynamic memory and send the software instructions over a telephone line using a modem. A modem local to computing device 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor(s) 1404 retrieves and executes the software instructions. The software instructions received by main memory 1406 may optionally be stored on storage device(s) 1410 either before or after execution by processor(s) 1404.

Computing device 1400 also may include one or more communication interface(s) 1418 coupled to bus 1402. A communication interface 1418 provides a two-way data communication coupling to a wired or wireless network link 1420 that is connected to a local network 1422 (e.g., Ethernet network, Wireless Local Area Network, cellular phone network, Bluetooth wireless network, or the like). Communication interface 1418 sends and receives electrical, electromagnetic, or optical signals that carry digital data streams representing various types of information. For example, communication interface 1418 may be a wired network interface card, a wireless network interface card with an integrated radio antenna, or a modem (e.g., ISDN, DSL, or cable modem).

Network link(s) 1420 typically provide data communication through one or more networks to other data devices. For example, a network link 1420 may provide a connection through a local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network(s) 1422 and Internet 1428 use electrical, electromagnetic or optical signals that carry digital data streams. The signals through the various networks and the signals on network link(s) 1420 and through communication interface(s) 1418, which carry the digital data to and from computing device 1400, are example forms of transmission media.

Computing device 1400 can send messages and receive data, including program code, through the network(s), network link(s) 1420 and communication interface(s) 1418. In the Internet example, a server 1430 might transmit a requested code for an application program through Internet 1428, ISP 1426, local network(s) 1422 and communication interface(s) 1418. Server 1430 may instead be connected directly to local network(s) 1422 as opposed to indirectly via Internet 1428 or ISP 1426. In this case, computing device 1400 may communicate with server 1430 over local network(s) 1422 without requiring Internet 1428 or ISP 1426.

The received code may be executed by processor 1404 as it is received, and/or stored in storage device 1410, or other non-volatile storage for later execution.

Basic Software System

Figure 15:
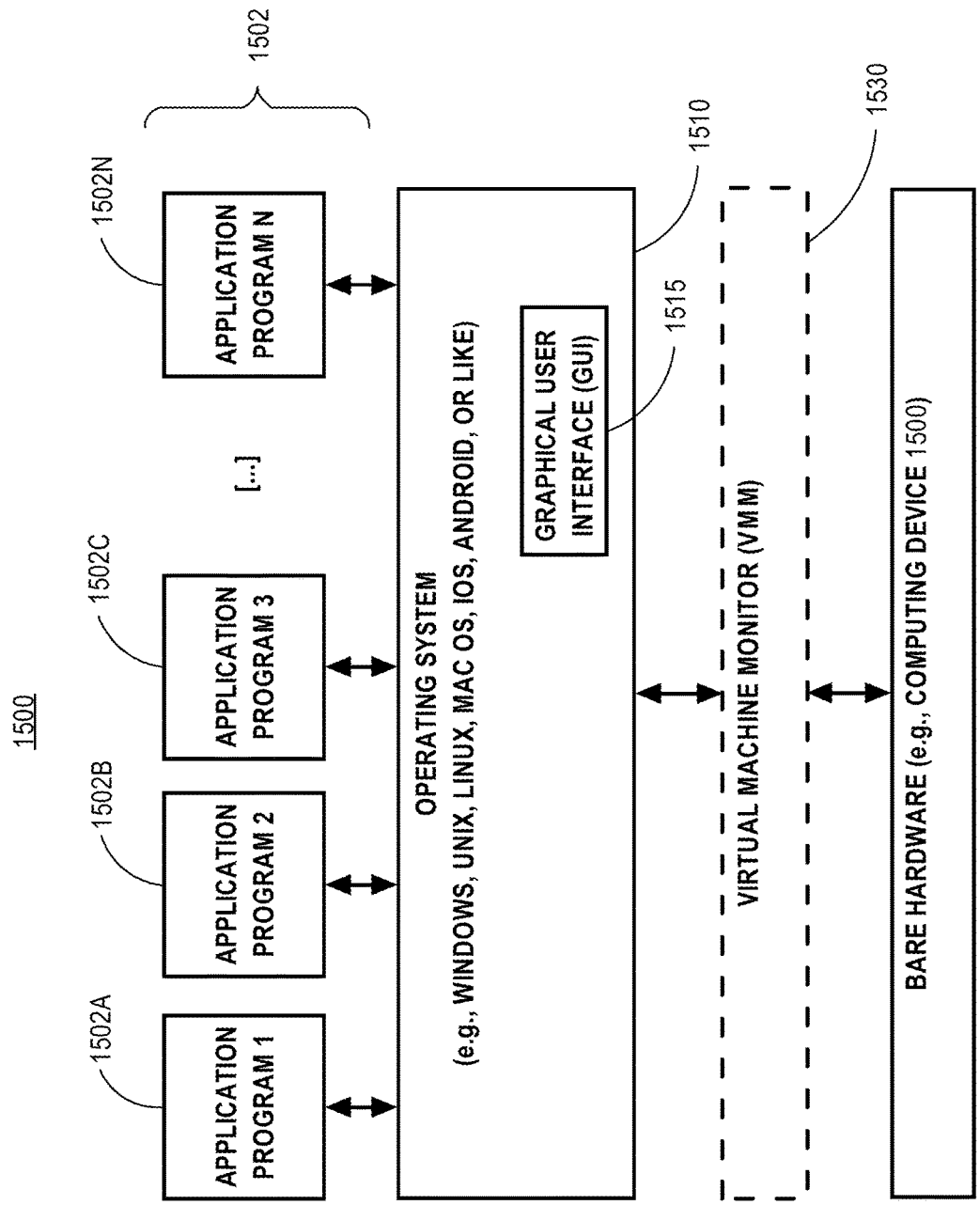
FIG. 15 is a block diagram of a basic software system for controlling the operation of the computing device of FIG. 14, according to some embodiments of the present invention.

FIG. 15 is a block diagram of a basic software system 1500 that may be employed for controlling the operation of computing device 1400. Software system 1500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1500 is provided for directing the operation of computing device 1400. Software system 1500, which may be stored in system memory (RAM) 1406 and on fixed storage (e.g., hard disk or flash memory) 1410, includes a kernel or operating system (OS) 1510.

The OS 1510 manages low-level aspects of computer operation, including managing execution of processes, memory allocation, file input and output (I/O), and device I/O. One or more application programs, represented as 1502A, 1502B, 1502C . . . 1502N, may be "loaded" (e.g., transferred from fixed storage 1410 into memory 1406) for execution by the system 1500. The applications or other software intended for use on device 1500 may also be stored as a set of downloadable computer-executable instructions, for example, for downloading and installation from an Internet location (e.g., a Web server, an app store, or other online service).

Software system 1500 includes a graphical user interface (GUI) 1515, for receiving user commands and data in a graphical (e.g., "point-and-click" or "touch gesture") fashion. These inputs, in turn, may be acted upon by the system 1500 in accordance with instructions from operating system 1510 and/or application(s) 1502. The GUI 1515 also serves to display the results of operation from the OS 1510 and application(s) 1502, whereupon the user may supply additional inputs or terminate the session (e.g., log off).

OS 1510 can execute directly on the bare hardware 1520 (e.g., processor(s) 1404) of device 1400. Alternatively, a hypervisor or virtual machine monitor (VMM) 1530 may be interposed between the bare hardware 1520 and the OS 1510. In this configuration, VMM 1530 acts as a software "cushion" or virtualization layer between the OS 1510 and the bare hardware 1520 of the device 1400.

VMM 1530 instantiates and runs one or more virtual machine instances ("guest machines"). Each guest machine comprises a "guest" operating system, such as OS 1510, and one or more applications, such as application(s) 1502, designed to execute on the guest operating system. The VMM 1530 presents the guest operating systems with a virtual operating platform and manages the execution of the guest operating systems.

In some instances, the VMM 1530 may allow a guest operating system to run as if it is running on the bare hardware 1520 of device 1400 directly. In these instances, the same version of the guest operating system configured to execute on the bare hardware 1520 directly may also execute on VMM 1530 without modification or reconfiguration. In other words, VMM 1530 may provide full hardware and CPU virtualization to a guest operating system in some instances.

In other instances, a guest operating system may be specially designed or configured to execute on VMM 1530 for efficiency. In these instances, the guest operating system is "aware" that it executes on a virtual machine monitor. In other words, VMM 1530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method for service lifecycle management, the method comprising:
obtaining, at a first host of one or more hosts in a distributed computing environment, service-host binding information from a replica of a distributed configuration store, wherein the replica of the distributed configuration store represents a local copy of the service-host binding information;
determining, at the first host, one or more services to watch based on the service-host binding information, a service of the one or more services being a single instance of a software product or software application installed on at least the first host or one of the one or more hosts in a distributed computing environment;
setting a watch on the one or more services to watch;
based on the watch, receiving a notification that a target state of a particular service of the one or more services to watch is modified, comprising updating target state information in the replica of the distributed configuration store using a consensus protocol that allows hosts to agree on an ordering for changes in the distributed configuration store;

wherein the updated target state of the particular service represents a desired operational state for the particular service;

determining, at the first host, a current state of the particular service of the one or more services to watch, wherein the current state represents an operational state for the particular service, and wherein the particular service is hosted at the first host;

determining whether the current state of the particular service is inconsistent with the updated target state of the particular service of the one or more services to watch;

in response to determining that the current state of the particular service is inconsistent with the updated target state of the particular service, the first host taking a corrective action to modify the particular service, which causes the current state of the particular service to be consistent with the updated target state of the particular service.

2. The method of claim 1, wherein the one or more services to watch is determined based on an identifier of the first host.

3. The method of claim 1, wherein the one or more services to watch is determined by enumerating one or more child keys of a predefined key that includes an identifier of the first host in a key name associated with the predefined key.

4. The method of claim 1, wherein the watch comprises at least one of: a forward watch, a historical and forward watch, or a non-recursive watch.

5. The method of claim 1, wherein the corrective action taken to modify the particular service by the first host is based on the updated target state of the particular service.

6. The method of claim 1, further comprising:
in response to determining that the current state of the particular service at the first host is not inconsistent with the updated target state for the particular service, continuing to watch the one or more services to watch.

7. One or more non-transitory computer-readable media storing one or more programs for execution by one or more processors, the one or more programs comprising instructions for:
obtaining, at a first host, service-host binding information from a replica of a distributed configuration store;
determining, at the first host, one or more services to watch based on the service-host binding information, a service of the one or more services being a single instance of a software product or software application installed on one or more hosts in a distributed computing environment;
setting a watch on the one or more services to watch;
receiving a notification that a target state of a particular service of the one or more services to watch is modified, comprising updating target state information in the replica of the distributed configuration store using a consensus protocol that allows hosts to agree on an ordering for changes in the distributed configuration store;
wherein the target state of the particular service represents a desired operational state for the particular service;
determining, at the first host, a current state of the particular service of the one or more services to watch, wherein the current state represents an operational state for the particular service, and wherein the particular service is hosted at the first host;
determining whether the current state of the particular service is inconsistent with the target state of the particular service of the one or more services to watch;
in response to determining that the current state of the particular service is inconsistent with the target state of the particular service, the first host taking a corrective action to modify the particular service, which causes the current state of the particular service to be consistent with the target state of the particular service.

8. The one or more non-transitory computer-readable media of claim 7, wherein the one or more services to watch is determined based on an identifier of the first host.

9. The one or more non-transitory computer-readable media of claim 7, wherein the one or more services to watch is determined by enumerating one or more child keys of a predefined key that includes an identifier of the first host in a key name associated with the predefined key.

10. The one or more non-transitory computer-readable media of claim 7, wherein the watch comprises at least one of: a forward watch, a historical and forward watch, or a non-recursive watch.

11. The one or more non-transitory computer-readable media of claim 7, wherein the corrective action taken to modify the particular service by the first host is based on the updated target state of the particular service.

12. The one or more non-transitory computer-readable media of claim 7, further comprising instructions which, when executed by the one or more processors, cause:
in response to determining that the current state of the particular service at the first host is not inconsistent with the updated target state for the particular service, continuing to watch the one or more services to watch.

13. A system, comprising:
one or more processors;
one or more storage media storing one or more programs for execution by the one or more processors, the one or more programs comprising instructions for:
obtaining, at a first host of one or more hosts in a distributed computing environment, service-host binding information from a replica of a distributed configuration store, wherein the replica of the distributed configuration store represents a local copy of the service-host binding information;
determining, at the first host, one or more services to watch based on the service-host binding information, a service of the one or more services being a single instance of a software product or software application installed on at least the first host or one of the one or more hosts in a distributed computing environment;
setting a watch on the one or more services to watch;
based on the watch, receiving a notification that a target state of a particular service of the one or more services to watch is modified, comprising updating target state information in the replica of the distributed configuration store using a consensus protocol that allows hosts to agree on an ordering for changes in the distributed configuration store;
wherein the updated target state of the particular service represents a desired operational state for the particular service;
determining, at the first host, a current state of the particular service of the one or more services to watch, wherein the current state represents an operational state for the particular service, and wherein the particular service is hosted at the first host;

determining whether the current state of the particular service is inconsistent with the updated target state of the particular service of the one or more services to watch;

in response to determining that the current state of the particular service is inconsistent with the updated target state of the particular service, the first host taking a corrective action to modify the particular service, which causes the current state of the particular service to be consistent with the updated target state of the particular service.

14. The system of claim 13, wherein the one or more services to watch is determined based on an identifier of the first host.

15. The system of claim 13, wherein the one or more services to watch is determined by enumerating one or more child keys of a predefined key that includes an identifier of the first host in a key name associated with the predefined key.

16. The system of claim 13, wherein the watch comprises at least one of: a forward watch, a historical and forward watch, or a non-recursive watch.

17. The system of claim 13, wherein the corrective action taken to modify the particular service by the first host is based on the updated target state of the particular service.

18. The system of claim 13, further comprising instructions which, when executed by the one or more processors, cause:

in response to determining that the current state of the particular service at the first host is not inconsistent with the updated target state for the particular service, continuing to watch the one or more services to watch.

* * * * *